(12) United States Patent
Kaneko

(10) Patent No.: US 9,706,100 B2
(45) Date of Patent: Jul. 11, 2017

(54) IMAGING APPARATUS, METHOD FOR SETTING VOICE COMMAND, AND STORAGE MEDIUM

(71) Applicant: CANON KABUSHIKI KAISHA, Tokyo (JP)

(72) Inventor: Kazue Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/962,063

(22) Filed: Dec. 8, 2015

(65) Prior Publication Data

US 2016/0182800 A1 Jun. 23, 2016

(30) Foreign Application Priority Data

Dec. 22, 2014 (JP) .................. 2014-259197

(51) Int. Cl.
*H04N 5/232* (2006.01)
*G10L 15/28* (2013.01)
*G10L 15/22* (2006.01)

(52) U.S. Cl.
CPC ......... *H04N 5/23203* (2013.01); *G10L 15/28* (2013.01); *H04N 5/23245* (2013.01); *G10L 2015/223* (2013.01)

(58) Field of Classification Search
CPC ........... H04N 5/23203; H04N 5/23219; H04N 1/00403; G10L 15/28; G10L 2015/223; G06F 3/167
See application file for complete search history.

(56) References Cited

U.S. PATENT DOCUMENTS

| 5,521,635 A * | 5/1996 | Mitsuhashi | H04N 5/772 348/231.4 |
| 2004/0119837 A1* | 6/2004 | Inoue | G06F 17/30067 348/207.99 |
| 2005/0128311 A1* | 6/2005 | Rees | H04N 5/23203 348/211.99 |
| 2010/0134677 A1 | 6/2010 | Yamamoto et al. | 348/333.01 |
| 2012/0086833 A1* | 4/2012 | Taira | H04N 5/23219 348/231.99 |
| 2013/0021459 A1* | 1/2013 | Vasilieff | G10L 25/78 348/77 |
| 2013/0335587 A1* | 12/2013 | Takatsuka | H04N 5/23219 348/211.4 |

(Continued)

*Primary Examiner* — Jason Flohre
(74) *Attorney, Agent, or Firm* — Fitzpatrick, Cella, Harper & Scinto

(57) ABSTRACT

An imaging apparatus comprising a photographing unit which performs photographing and a sound collection unit which collects voice, comprising determining whether a condition to enable a voice command function which executes predetermined processing according to a voice associated with the predetermined processing in a case where a selfie mode, which is an operation mode for photographing, by an operator, the operator himself with the photographing unit, is set, enabling the voice command function in a case where the selfie mode is not set, and changing to enable the voice command function according to a change from a state in which the condition to enable the voice command function is not satisfied to a state in which the condition is satisfied with the voice command function in a disable state in a case where the selfie mode is set.

17 Claims, 19 Drawing Sheets

(56) References Cited

U.S. PATENT DOCUMENTS

| | | | | |
|---|---|---|---|---|
| 2014/0358535 A1* | 12/2014 | Lee | ............ | G10L 15/22 |
| | | | | 704/233 |
| 2015/0207985 A1* | 7/2015 | Uemura | ............ | H04N 5/265 |
| | | | | 348/333.01 |

* cited by examiner

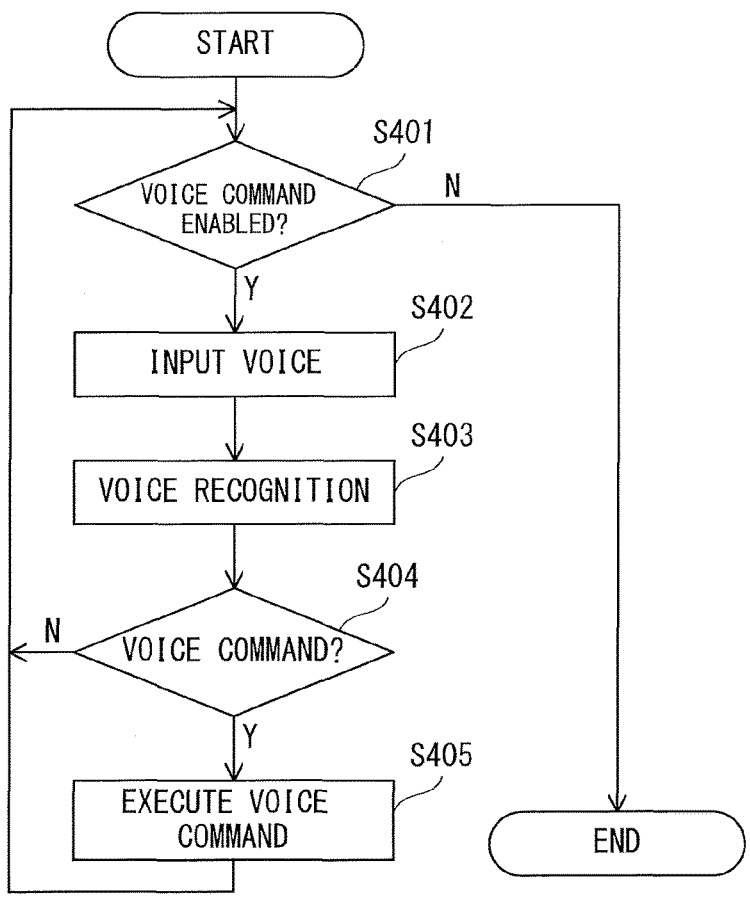

FIG. 6A

| | VOICE COMMAND |
|---|---|
| OPERATION MODE SWITCHING COMMAND | PHOTOGRAPHING MODE, REPRODUCING MODE |
| PHOTOGRAPHING MODE OPERATION COMMAND | TURN ON SELFIE MODE, TURN OFF SELFIE MODE, START, START PHOTOGRAPHING, STOP, FINISH PHOTOGRAPHING, PAUSE, TEMPORARILY STOP, RESUME, RESTART, ZOOM IN, ZOOM OUT |
| REPRODUCING MODE OPERATION COMMAND | LIST UP, FIRST, SECOND, NEXT, FORWARD, OPTION, START, STOP, PAUSE |

FIG. 6B

| | VOICE COMMAND |
|---|---|
| OPERATION COMMAND FOR SELFIE MODE | CAMERA START, CAMERA START PHOTOGRAPHING, CAMERA STOP, CAMERA FINISH PHOTOGRAPHING, CAMERA PAUSE, CAMERA TEMPORARILY STOP, CAMERA RESUME, CAMERA RESTART, CAMERA ZOOM IN, CAMERA ZOOM OUT |

FIG. 21A

| TOLERANCE | VOICE COMMAND |
|---|---|
| HIGH | START, START PHOTOGRAPHING, RESUME, RESTART |
| MIDDLE | ZOOM IN, ZOOM OUT |
| LOW | FINISH PHOTOGRAPHING, STOP, PAUSE, TEMPORARILY STOP |

FIG. 21B

IMAGING APPARATUS, METHOD FOR SETTING VOICE COMMAND, AND STORAGE MEDIUM

BACKGROUND OF THE INVENTION

Field of the Invention

The present disclosure relates to an imaging apparatus capable of photographing a still image and a moving image. In particular, the present disclosure relates to a user interface for operating the imaging apparatus.

Description of the Related Art

There is an imaging apparatus such as a video camera, still camera, etc., which employs operator's voice as a user interface. Such an imaging apparatus comprises a voice command function which performs voice recognition to the operator's voice and performs processing corresponding to the recognition result. When using the voice command function, a distance between an utterance position of the operator and a sound collecting device (microphone) gives an influence on the result of the voice recognition. The closer the distance between the utterance position and the microphone is, the smaller the influence of background noise becomes. The longer the distance between the utterance position and the microphone is, the larger influence of the background noise becomes.

In United States Patent Application Publication No. US2010/0134677, an imaging apparatus is disclosed, in which, according to a distance between an utterance position and a microphone, a model or a parameter of a microphone or voice recognition is optimally set and processing is performed by a voice input. The imaging apparatus determines the distance between the utterance position and the microphone depending on whether the operator is looking into a viewfinder of the imaging apparatus or watching a display provided on a back surface of the imaging apparatus. By optimally setting the model or the parameter of the microphone or the voice recognition according to the distance between the utterance position and the microphone, the imaging apparatus suppresses the influence of the background noise.

In the imaging apparatus disclosed in the United States Patent Application Publication No. US2010/0134677, it is assumed that the operator operates the imaging apparatus from behind the imaging apparatus. So, the operator directly instructs timing to utter a voice command by pressing down a button etc. provided on the imaging apparatus. The "voice command" means voice associated with predetermined processing. The imaging apparatus performs corresponding processing by performing the voice recognition of the voice command.

In recent years, demand of what is called "selfie", an act of the operator's self-photographing using the imaging apparatus, has been increasing. In many cases, through the selfie, the operator photographs his face etc. by extending his arm holding the imaging apparatus. Besides, there is a case where the imaging apparatus is set, the operator becomes an object, and a scene of an operator's performance is photographed in front of the imaging apparatus.

In the case where the imaging apparatus is set and the operator becomes the object in front of the imaging apparatus, in many cases, the operator is at a position where he cannot reach the imaging apparatus. It is also assumed a case where the operator wishes to instruct to start photographing instead of directly operating the imaging apparatus. In these cases, the operator cannot directly instruct timing to utter the voice command to the imaging apparatus so that the operator is required to previously enable the voice command function of the imaging apparatus. However, there is a possibility that, while the operator enables the voice command function and moves to a position at which he is photographed, the imaging apparatus starts photographing due to false recognition. There is also a possibility that the imaging apparatus falsely recognizes what is spoken by the operator during the photographing as the voice command and completes the photographing.

Thereby, the imaging apparatus which reduces possibility of erroneous recognition of the voice command is required.

SUMMARY OF THE INVENTION

An imaging apparatus of the present disclosure which solves the problems as above comprises a photographing unit configured to perform photographing; a sound collection unit configured to collect voice; a determination unit configured to determine whether a condition to enable a voice command function which executes predetermined processing according to a voice associated with the predetermined processing in a case where a selfie mode, which is an operation mode for photographing, by an operator, the operator himself with the photographing unit, is set; and a control unit configured, in a case where the selfie mode is not set, to enable the voice command function, and configured, in a case where the selfie mode is set, to change to enable the voice command function according to a change from a state in which the condition is not satisfied to a state in which the condition is satisfied based on the determination result by the determination unit with the voice command function in a disable state.

Further features of the present invention will become apparent from the following description of exemplary embodiments (with reference to the attached drawings).

BRIEF DESCRIPTION OF THE DRAWINGS

FIGS. 6A and 6B are diagrams explaining processing according to the voice command.

FIG. 21A is a diagram representing an example illustrating the voice command which is made longer and FIG. 21B is an explanatory diagram of tolerance.

DESCRIPTION OF THE EMBODIMENTS

In the following, embodiments are described in detail with reference to the accompanying drawings. It is noted that the components described in the present embodiment are simply an illustration and the scope of the present invention is not limited to the components.

First Embodiment

Figure 1A:
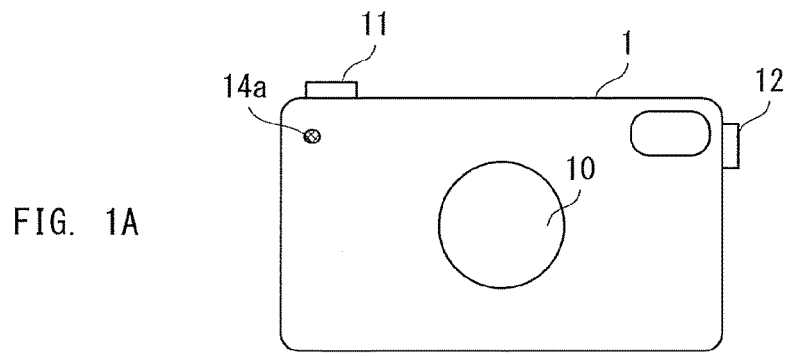
FIGS. 1A and 1B are appearance diagrams of the imaging apparatus.
Figure 1B:
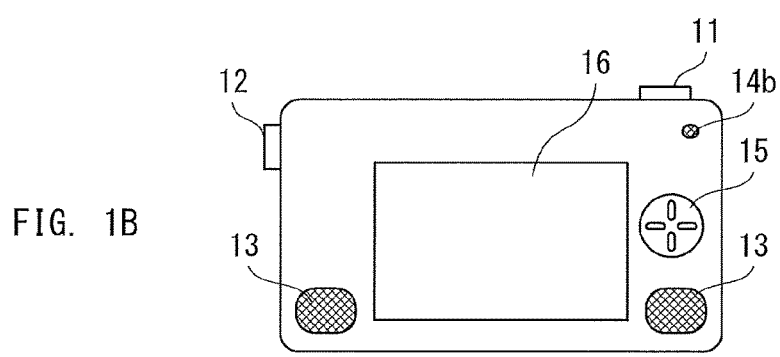

FIGS. 1A and 1B are appearance diagrams of the imaging apparatus according to the present embodiment. FIG. 1A is a front surface view of the imaging apparatus. FIG. 1B is a back surface view of the imaging apparatus. An imaging apparatus 1 is formed of a camera shape comprising of a main body and a lens. The shape, however, is not limited to this as long as it has an imaging function. For example, as the imaging apparatus 1, apparatus comprising the photographing function and the sound collecting function, such as smartphones, feature phones, camera-equipped personal computers, etc., may be used. The imaging apparatus 1 is capable of photographing a still image and a moving image. Also, the imaging apparatus 1 comprises a voice command function which recognizes a voice command associated with predetermined processing and performs processing according to the recognition result.

A lens 10, a shutter button 11, a voice processing operation button 12, and a front-side microphone 14a are provided on a front surface of the imaging apparatus 1. A speaker 13, a back-side microphone 14b, a setting button 15, and a display 16 are provided on a back surface of the imaging apparatus 1.

The lens 10 is an optical system which is directed to an object, which condenses the light from the object on an imaging element (not shown) in the imaging apparatus 1. The shutter button 11 is an operation button used to instruct to start photographing. With the shutter button 11, the operator inputs an instruction to start photographing to the imaging apparatus 1. The voice processing operation button 12 is an operation button used to enable the voice command function. With the voice processing operation button 12, the operator inputs an instruction to enable the voice command function to the imaging apparatus 1. The speaker 13 is a sound output device used to output sound when a moving image is reproduced by the imaging apparatus 1. In the example shown in FIG. 1B, the speaker 13 is provided on the back surface of the imaging apparatus 1 to be directed to a user who visually recognizes the display 16. The speaker 13, however, may be provided on the front surface or both surfaces of the imaging apparatus 1.

The front-side microphone 14a and the back-side microphone 14b are sound collecting device, which are used to collect sound at the time of photographing the moving image by the imaging apparatus 1. Also, the front-side microphone 14a and the back-side microphone 14b are used by the operator to input voice when the voice command function is enabled. It is noted that when it is not necessary to distinguish the front-side microphone 14a from the back-side microphone 14b, they are simply described as "microphone 14".

The setting button 15 is an operation button used to set various functions, photographing conditions, etc. With the setting button 15, the operator performs various settings to the imaging apparatus 1. The display 16 is, for example, a liquid crystal display and functions as a viewfinder. In addition, the display 16 displays a setting screen at the time of setting the various functions, reproduces and displays the still image and the moving image photographed, etc. Also, being provided a transparent touch pad on its display surface, the display 16 also functions as a touch panel.

Figure 2:
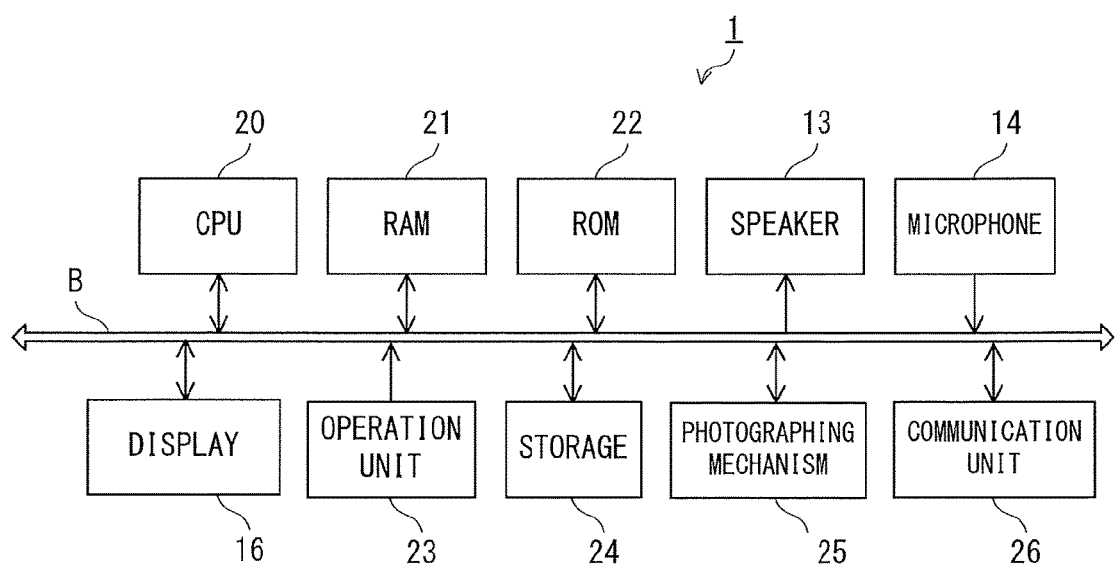
FIG. 2 is a hardware configuration diagram of the imaging apparatus.

FIG. 2 is a hardware configuration diagram of the imaging apparatus 1. The operation of the imaging apparatus 1 is controlled by a CPU (Central Processing Unit) 20, a RAM (Random Access Memory) 21, and a ROM (Read Only Memory) 22. The CPU 20 controls the operation of each unit consisting of the imaging apparatus 1 by reading a computer program from the ROM 22 and executes the computer program using the RAM 21 as a work area. The imaging apparatus 1 comprises the CPU 20, the RAM 21, the ROM 22, the speaker 13, the microphone 14 and the display 16. In addition, the imaging apparatus 1 comprises an operation unit 23, storage 24, photographing mechanism 25 and a communication unit 26. Each component can establish communication with each other via a bus B.

The operation unit 23 receives an instruction according to the operation of the operator from the shutter button 11, the voice processing operation button 12, the setting button 15, and the touch panel. The operation unit 23 inputs the instruction received to the CPU 20. The CPU 20 performs processing according to the instruction from the operation unit 23. The storage 24 is an external storage device and is mounted to the imaging apparatus 1. The storage 24 stores the still image and the moving image photographed. The photographing mechanism 25 consists of the lens 10, the imaging element, etc., and performs photographing by the control of the CPU 20. The communication unit 26, for example, controls the communication between the imaging apparatus 1 and the external device by wireless communication. The imaging apparatus 1, for example, outputs the still image and the moving image photographed to the external device.

Figure 3:
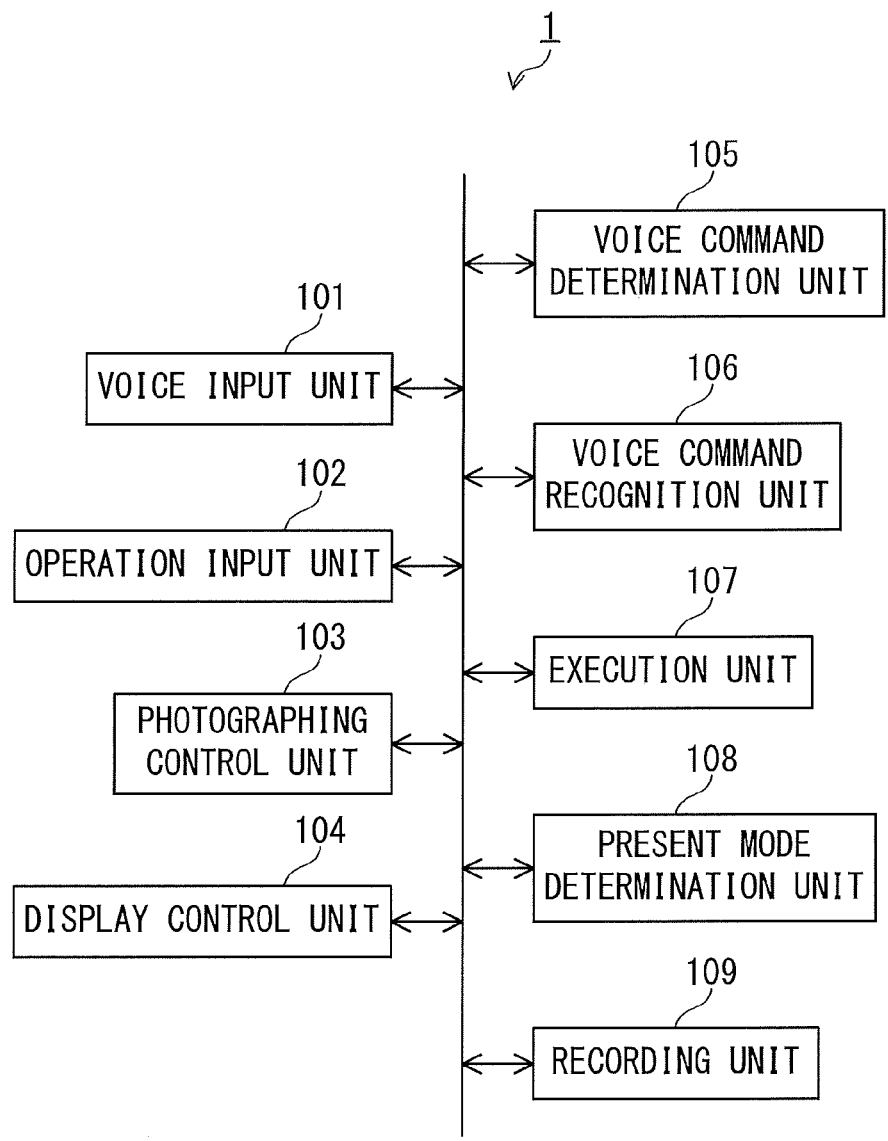
FIG. 3 is a functional block diagram of the imaging apparatus.

FIG. 3 is a functional block diagram representing the function of the imaging apparatus 1. FIG. 3 represents the voice command function, in which other functions which can be realized by the imaging apparatus 1 are omitted. The CPU 20 realizes each function of the imaging apparatus 1 by executing the computer program. The imaging apparatus 1 functions as a voice input unit 101, an operation input unit 102, a photographing control unit 103, a display control unit 104, a voice command determination unit 105, a voice command recognition unit 106, an execution unit 107, a present mode determination unit 108, and a recording unit 109.

The voice input unit 101, realized by the microphone 14 and the CPU 20, receives voice collected by the microphone 14. The voice input unit 101 collects voice at the time of photographing the moving image or collects voice for a voice command. As mentioned, the voice command means voice associated with predetermined processing. When the voice command collected in the voice input unit 101 is voice recognized, corresponding processing is performed. The operation input unit 102, realized by the CPU 20 and the operation unit 23, inputs the operator's instruction received by the operation unit 23 to the CPU 20.

The photographing control unit 103, realized by the CPU 20, controls the operation of the photographing mechanism 25 and performs photographing of the still image and the moving image. The display control unit 104, realized by the CPU 20 and the display 16, displays an image on the display 16. The image displayed includes a reproduced image of the image photographed, a setting screen for operating and setting the imaging apparatus 1, etc.

The voice command determination unit 105, realized by the CPU 20, determines whether to enable the voice command function or not depending on whether a condition to enable the voice command function is satisfied or not. The voice command recognition unit 106, realized by the CPU 20, performs voice recognition processing of the voice collected in the voice input unit 101 when the voice command function is enabled, and extracts the voice command. The execution unit 107, realized by the CPU 20, executes processing according to the instruction input from the operation input unit 102 and the voice command.

The present mode determination unit 108, realized by the CPU 20, determines an operation mode of the imaging apparatus 1. In the present embodiment, the present mode determination unit 108 determines whether the imaging apparatus 1 is in the operation mode of a "selfie mode" or not, in which the operator photographs the operator himself. The recording unit 109 is realized by the CPU 20 and the storage 24. The CPU 20 causes the recording unit 109 to store the still image and the moving image photographed.

Figure 4:
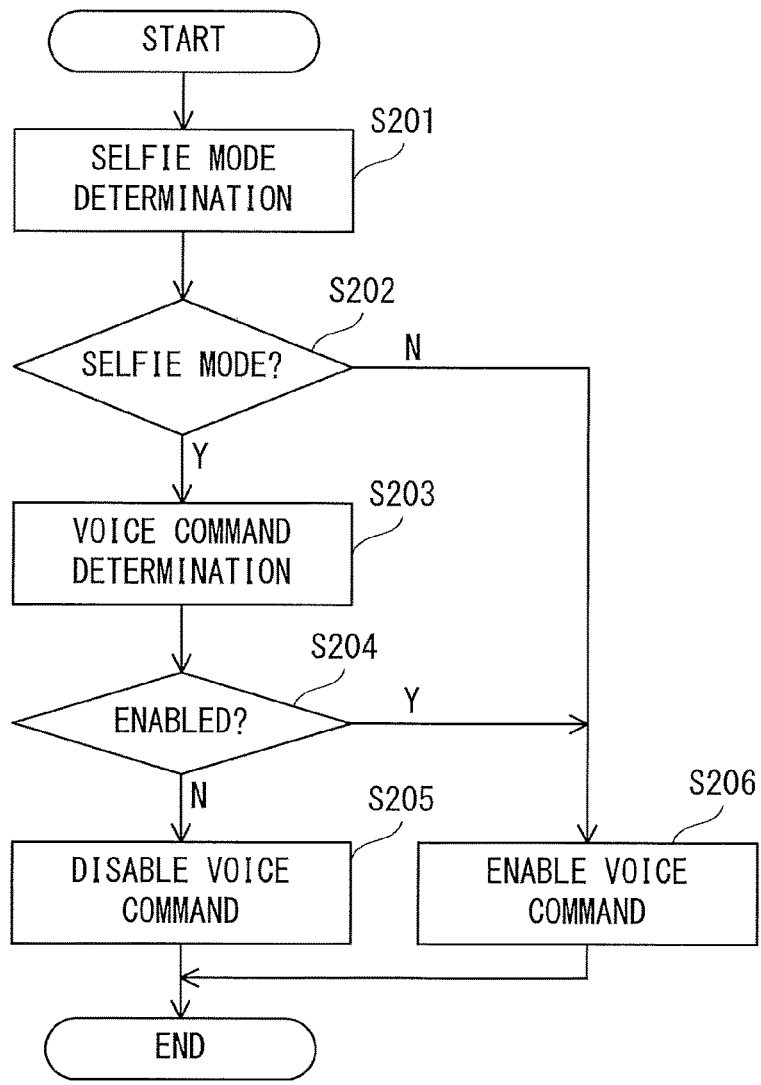
FIG. 4 is a flowchart representing processing to determine whether the voice command function is enabled or not.
Figure 5:
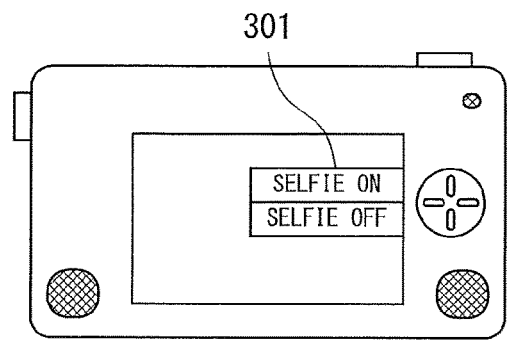
FIG. 5 is a diagram illustrating display of a display.

FIG. 4 is a flowchart representing processing to determine whether the voice command function is enabled or not. Through the operation of the operation unit 23, the operator can set the imaging apparatus 1 to the selfie mode. For example, through the operation of the touch panel or the setting button 15, the operator inputs an instruction to set the imaging apparatus 1 to the selfie mode. According to the instruction, the CPU 20 sets the selfie mode. FIG. 5 is a diagram illustrating a display of the display 16 in a case where the selfie mode is set through the touch panel. The operator can choose whether to enable the selfie mode or not through a pull down menu 301 displayed on the display 16. Further, in a case where the voice command function is already enabled, through a setting by the voice command (described later), the imaging apparatus 1 can be set to the selfie mode. The setting state of the selfie mode is, for example, stored in the RAM 21 as a flag.

When the processing to enable the voice command function or not is started, the imaging apparatus 1 determines whether the selfie mode is set or not by the present mode determination unit 108 (S201). The present mode determination unit 108 can determine the setting state of the selfie mode by, for example, checking the flag stored in the RAM 21.

If it is determined that the selfie mode is not set (S202: N), the CPU enables the voice command function and ends the processing (S206). If it is determined that the selfie mode is set (S202: Y), the voice command determination unit 105 determines whether the condition to enable the voice command function is satisfied or not (S203). In the present embodiment, as one example, the voice command determination unit 105 determines that the condition to enable the voice command function is satisfied when a fixed time period elapses after the setting state of the selfie mode is switched, for example. Particular processing of this case is described later. If it is determined that the condition to enable the voice command function is satisfied (S204: Y), the CPU 20 enables the voice command function and ends the processing (S206). If it is determined that the condition to enable the voice command function is not satisfied (S204: N), the CPU 20 disables the voice command function and ends the processing (S205). The fact of whether the voice command function is enabled or not is stored, for example, in the RAM 21 as a flag. It is noted that the condition to enable the voice command function is not limited to the condition of the length of the time period elapsed. For example the condition to enable the voice command function may be the detection of predetermined motion with an object previously set, detection of predetermined voice which is not the voice command, or appearance and disappearance of a predetermined object in a space being photographed.

In the above mentioned manner, the imaging apparatus 1 determines whether the voice command function is enabled or not. The processing is always performed or repeatedly performed at fixed time intervals. Also, the imaging apparatus 1 may perform the processing when the setting of the selfie mode is switched and the imaging apparatus 1 may repeatedly perform the processing after the Step S203 while it is set to the selfie mode. Due to this, the imaging apparatus 1 can suppress processing performed by erroneous recognition of the voice command.

When the voice command function is enabled, the imaging apparatus 1 performs processing according to the voice command.

FIGS. 6A and 6B are diagrams explaining processing according to the voice command. FIG. 6A is a flowchart representing processing corresponding to the voice command.

In the case of processing by the voice command, the CPU 20 first determines whether the voice command function is enabled or not (S401). If it is determined that the voice command function is disabled (S401: N), the CPU 20 ends the processing. If it is determined that the voice command function is enabled (S401: Y), the CPU 20 waits for the utterance of the operator toward the microphone 14.

When the operator utters toward the microphone 14, the voice input unit 101 inputs the voice of the operator collected by the microphone 14 to the CPU 20 (S402). It is noted that, when photographing, the microphone 14 is always collecting the voice, which is input to the CPU 20. The voice command recognition unit 106 performs the voice recognition processing to the voice input (S403). The voice command recognition unit 106 determines whether the voice input is the voice command or not through the voice recognition processing. FIG. 6B is an exemplary diagram of the voice command. The imaging apparatus 1 stores the list of the voice commands in the RAM 21, for example, as a table. Referring to the list, the voice command recognition unit 106 determines whether the voice input is the voice command or not.

If it is determined that the voice input is not the voice command (S404: N), the CPU 20 repeats the processing after the Step S401. If it is determined that the voice input is the voice command (S404: Y), the execution unit 107 executes processing associated with the voice command (S405). When the execution of the processing associated with the voice command is completed, the CPU 20 repeats the processing after the Step S401.

The imaging apparatus 1 capable of photographing the moving image comprises a photographing mode and reproducing mode as the operation mode. Referring to FIG. 6B, the voice command has an operation mode switching command which switches each operation mode and an operation command in each operation mode. The operation mode switching command includes "photographing mode" and "reproducing mode". When the operator utters "photographing mode" or "reproducing mode" toward the microphone 14, the voice command is input. The voice command recognition unit 106 performs the voice recognition processing and recognizes that "photographing mode" or "reproducing mode" is input. Based on the recognition result, the execution unit 107 switches the operation mode of the imaging apparatus 1.

As the photographing mode, the voice command of "Turn on selfie mode" and "Turn off selfie mode", which switches ON/OFF of the selfie mode, is provided. When the operator utters "Turn on selfie mode" or "Turn off selfie mode" toward the microphone 14, the voice command is input. The voice command recognition unit 106 performs the voice recognition processing and recognizes that "Turn on selfie mode" or "Turn off selfie mode" is input. Based on the recognition result, the execution unit 107 switches the selfie mode of the imaging apparatus 1.

It is noted that, in the processing of FIG. 4, which determines whether the voice command function is enabled or not, the determine method in the reproducing mode is not specifically described.

In the reproducing mode, the determine method in the reproducing mode is similar to the determining method in the photographing mode where selfie mode is not set.

If the voice command is constantly enabled when the selfie mode is not set, the conversation when photographing the object other than the operator himself or the voice at the time of reproducing the image by the imaging apparatus 1 may erroneously be recognized as the voice command. Thereby, even when the selfie mode is not set, the voice command function may be disabled. In such a case, the operator, for example, switches enable/disable of the voice command function by operating the voice processing operation button 12. The voice processing operation button 12, for example, may be the one which enables the voice command function while it is being pressed down. In addition, the voice processing operation button 12 may be the one which enables the voice command function only for a fixed time period after it is pressed down.

Figure 7A:
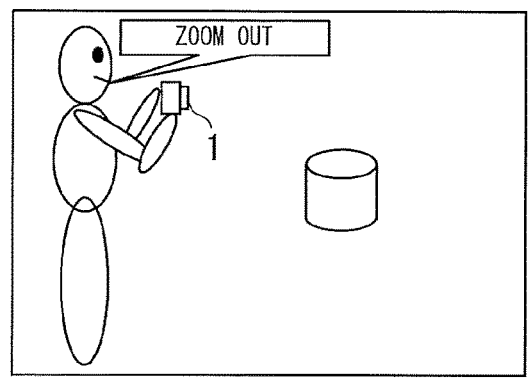
FIGS. 7A to 7D are diagrams illustrating a case of switching the voice command function depending on a state.
Figure 7B:
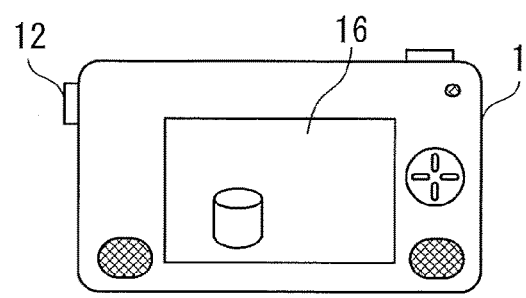
Figure 7C:
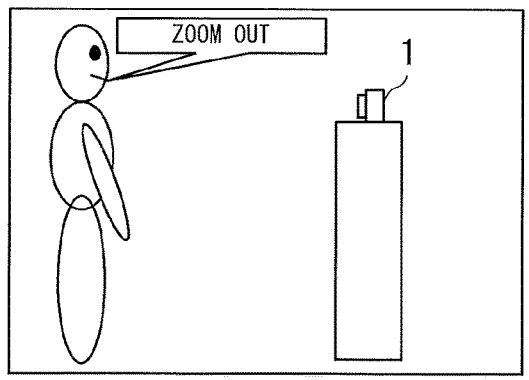
Figure 7D:
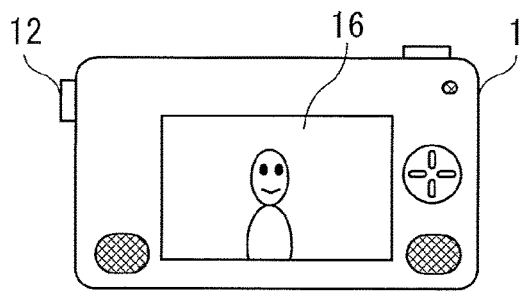

FIGS. 7A to 7D are diagrams illustrating a case of switching the voice command function according to a state of the imaging apparatus 1. FIG. 7A represents a state where the operator holds the imaging apparatus 1 and photographs the object other than the operator himself. FIG. 7B is a diagram illustrating a back surface of the imaging apparatus 1 in a state of FIG. 7A. The object being photographed is displayed on the display 16. FIG. 7C represents a state where the operator directs the imaging apparatus 1 toward the operator himself and photographs the operator himself. FIG. 7D is a diagram illustrating a back surface of the imaging apparatus 1 in a state of FIG. 7C. The operator being photographed is displayed on the display 16 as the object.

In FIGS. 7A and 7B, the operator can operate the imaging apparatus 1 at hand. So, the operator can press down the voice processing operation button 12 to enable the voice command function of the imaging apparatus 1. By directing the lens 10 toward the object, the operator can photograph the object while checking the photographing contents through the display 16.

It is possible to enable the voice command function by pressing down the voice processing operation button 12, which allows the imaging apparatus 1 to suppress processing performed by the erroneous recognition of the voice command.

In FIG. 7C and FIG. 7D, the operator and the imaging apparatus 1 are separately positioned so that the operator cannot touch the imaging apparatus 1. Due to this, the operator cannot press down the voice processing operation button 12. In this case, if the voice command function is enabled, the imaging apparatus 1 disables the voice command function until a predetermined time period elapses after the operator sets the selfie mode. Then, after a lapse of the predetermined time period, the imaging apparatus 1 enables the voice command function. For example, as shown in FIG. 7C, in a case where the operator needs to move to a position at which he is photographed, by enabling the voice command function after a lapse of the predetermined time period after the selfie mode is set, the imaging apparatus 1 can suppress processing performed by the erroneous recognition of the voice command while moving.

Figure 8:
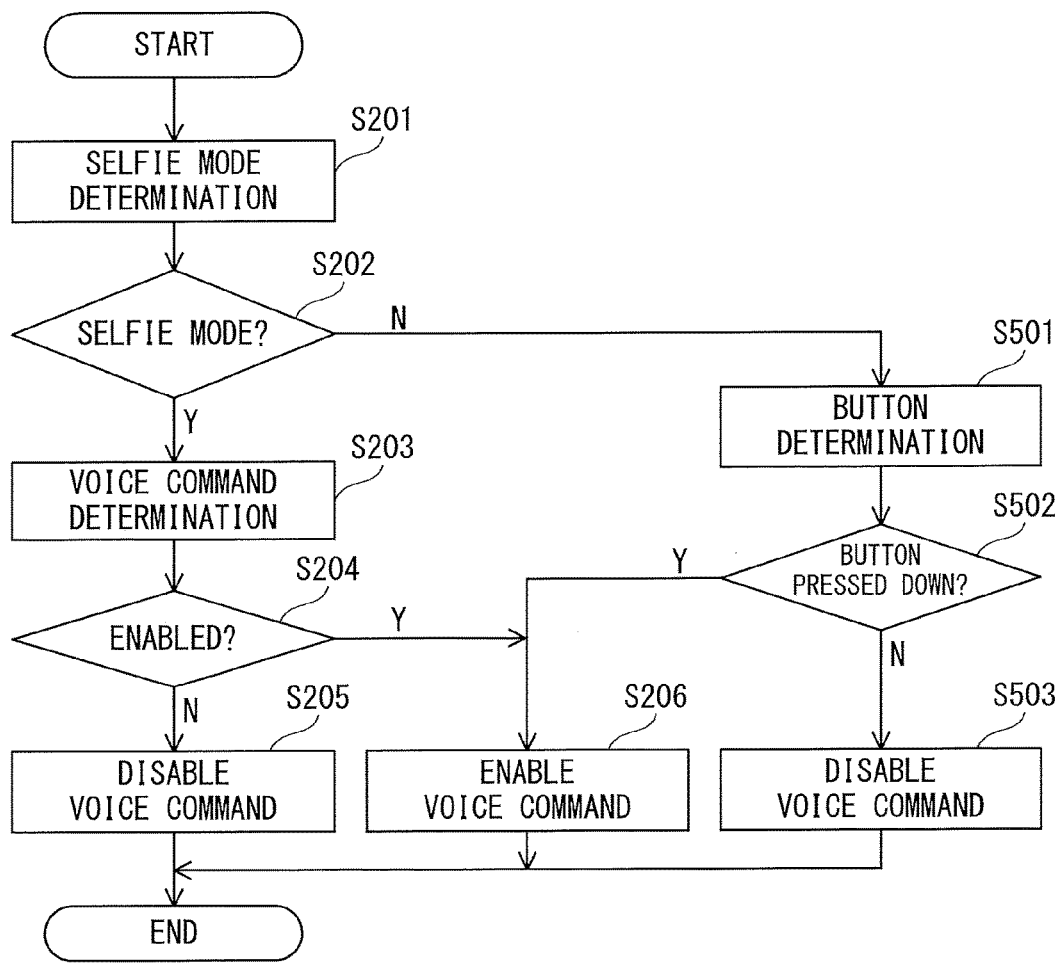
FIG. 8 is a flowchart representing processing to enable the voice command function.

FIG. 8 is a flowchart representing processing to enable the voice command function using the voice processing operation button 12 as illustrated in FIG. 7A and FIG. 7B. The same step number is attached to the processing similar to the processing in FIG. 4. A description is omitted with regard to the similar processing.

As the result of the determination by the present mode determination unit 108, if it is determined that the selfie mode is not set in the imaging apparatus 1 (S202: N), the CPU 20 determines whether or not an instruction representing that the voice processing operation button 12 is pressed down is input from the operation input unit 102 (S501). When the instruction is input, the CPU 20 can recognize that the voice processing operation button 12 is pressed down. If the voice processing operation button 12 is pressed down (S502: Y), the CPU 20 enables the voice command function (S206). If the voice processing operation button 12 is not pressed down (S502: N), the CPU 20 disables the voice command function and ends the processing (S503).

If the voice command function is already enabled, the CPU 20 waits to press down the voice processing operation button 12 until a predetermined time period elapses. If the voice processing operation button 12 is pressed down before the predetermined time period elapses, the CPU 20 continuously enables the voice command function and ends the processing (S502: Y, S206). If the voice processing operation button 12 is not pressed down before the predetermined time period elapses, the CPU 20 disables the voice command function and ends the processing (S502: N, S503).

Through the processing as mentioned, the imaging apparatus 1 can enable the voice command function only when the voice processing operation button 12 is operated. Thereby, even in the state in FIG. 7A, the imaging apparatus 1 can suppress processing performed by the erroneous recognition of the voice command.

Figure 9:
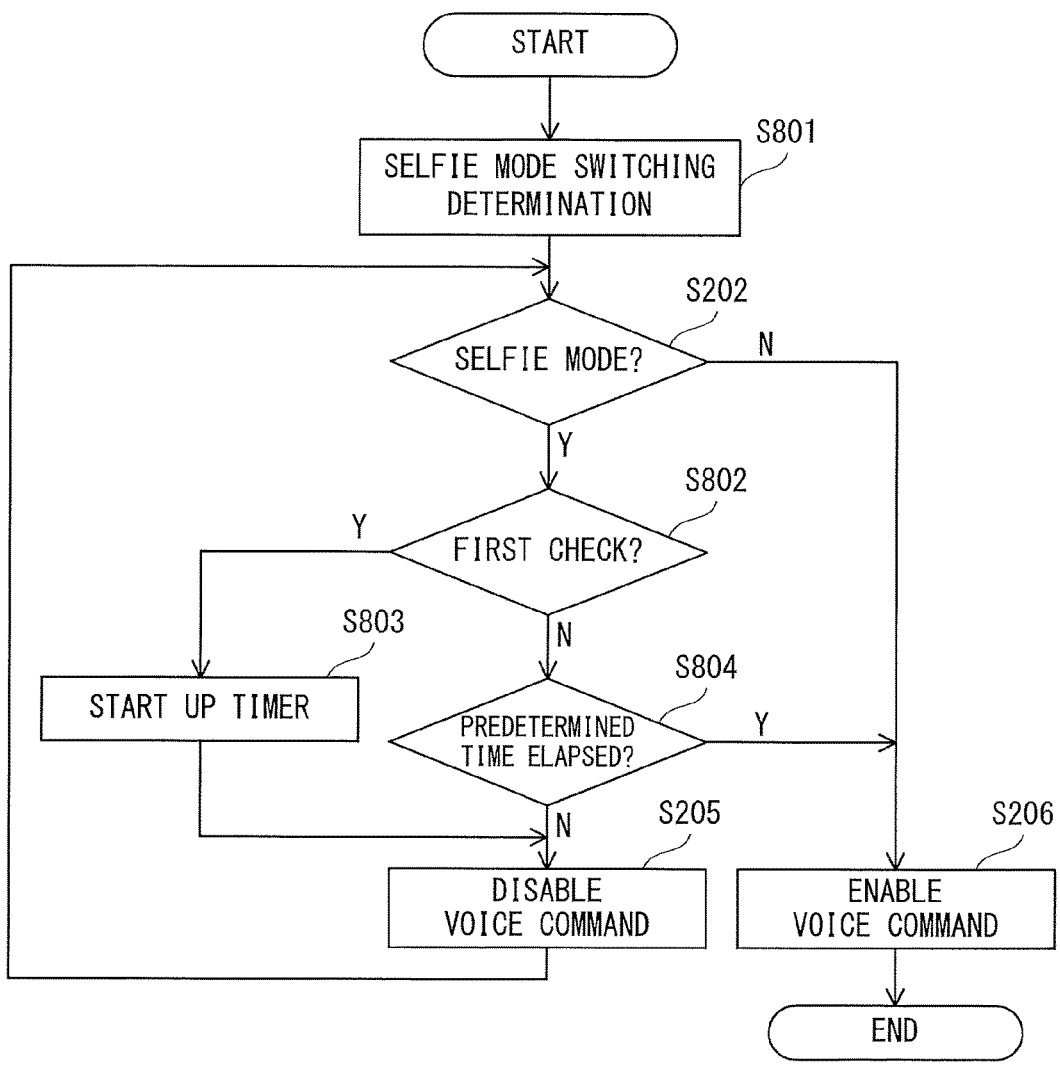
FIG. 9 is a flowchart representing processing to enable the voice command function.

FIG. 9 is a flowchart representing processing to enable the voice command function subject to a lapse of predetermined time after switching the setting to the selfie mode. Processing of Steps S802 to S804 is performed while the processing of Step S203 in FIG. 4 is being performed. This processing is particularly effective in a case where, for example, as illustrated in FIGS. 7C and 7D, the operator himself, who is the object, images away from the imaging apparatus 1, and is the processing which is, conventionally, often performed in the photographing using a self timer. In the self-timer photographing, however, it was required to rephotograph many times in some cases such as where the operator failed to move within a time period set due to some circumstances or where the time period is wrongly counted, which was cumbersome. In the case of the present embodiment, while the operator moves to a position at which he is photographed after the operator sets the imaging apparatus 1 to the selfie mode, the imaging apparatus 1 disables the voice command to suppress processing performed by the erroneous recognition of the voice command. After a lapse of the predetermined time period, the imaging apparatus 1 waits for the input of the voice command. Thereby, the operator can instruct photographing at an arbitrary timing after a lapse of an appropriate time period taken by the operator to move and after the operator adjusts a standing position or a pose. As mentioned, the imaging apparatus 1 can provide an environment which is easy to take a desired photograph.

The present mode determination unit 108 determines whether the operator switched the setting of the selfie mode by operating the operation unit 23 or not (S801). If the setting of the selfie mode is switched, the present mode determination unit 108 determines whether it is set to the selfie mode or not (S202). If it is determined that the selfie mode is not set (S202: N), the CPU 20 enables the voice command function (S206) and ends the processing (S206). When the operator photographs the object other than the operator himself as shown in FIG. 7A, this processing is performed.

If it is determined that the selfie mode is set (S202: Y), the CPU 20 determines whether it is a first check of the setting of the selfie mode or not (S802). If it is determined that it is the first check (S802: Y), the CPU 20 starts up a timer which measures time when the selfie mode is set (S803). The CPU 20 which started up the timer disables the voice command function (S205) and repeats the processing after the Step S202 which determines whether the selfie mode is set or not by the present mode determination unit 108.

If it is determined that it is not the first check (S802: N), the CPU 20 determines whether a predetermined time period has elapsed or not after the timer is checked and the selfie mode is set (S804). If it is determined that the predetermined time has elapsed (S804: Y), the CPU 20 enables the voice command function and ends the processing (S206). If it is determined that the predetermined time is not elapsed (S804: N), the CPU 20 disables the voice command function (S205) and repeats the processing after the Step S202 which determines whether the selfie mode is set or not by the present mode determination unit 108.

Through the processing as mentioned, the imaging apparatus 1 can enable the voice command after an elapse of the predetermined time period from the selfie mode is set. Thereby, even in the state in FIG. 7C state, the imaging apparatus 1 can suppress processing performed by the erroneous recognition of the voice command. It is noted that the predetermined time period from the selfie mode is set may be determined by the operator through the operation unit 23, for example.

Figure 10:
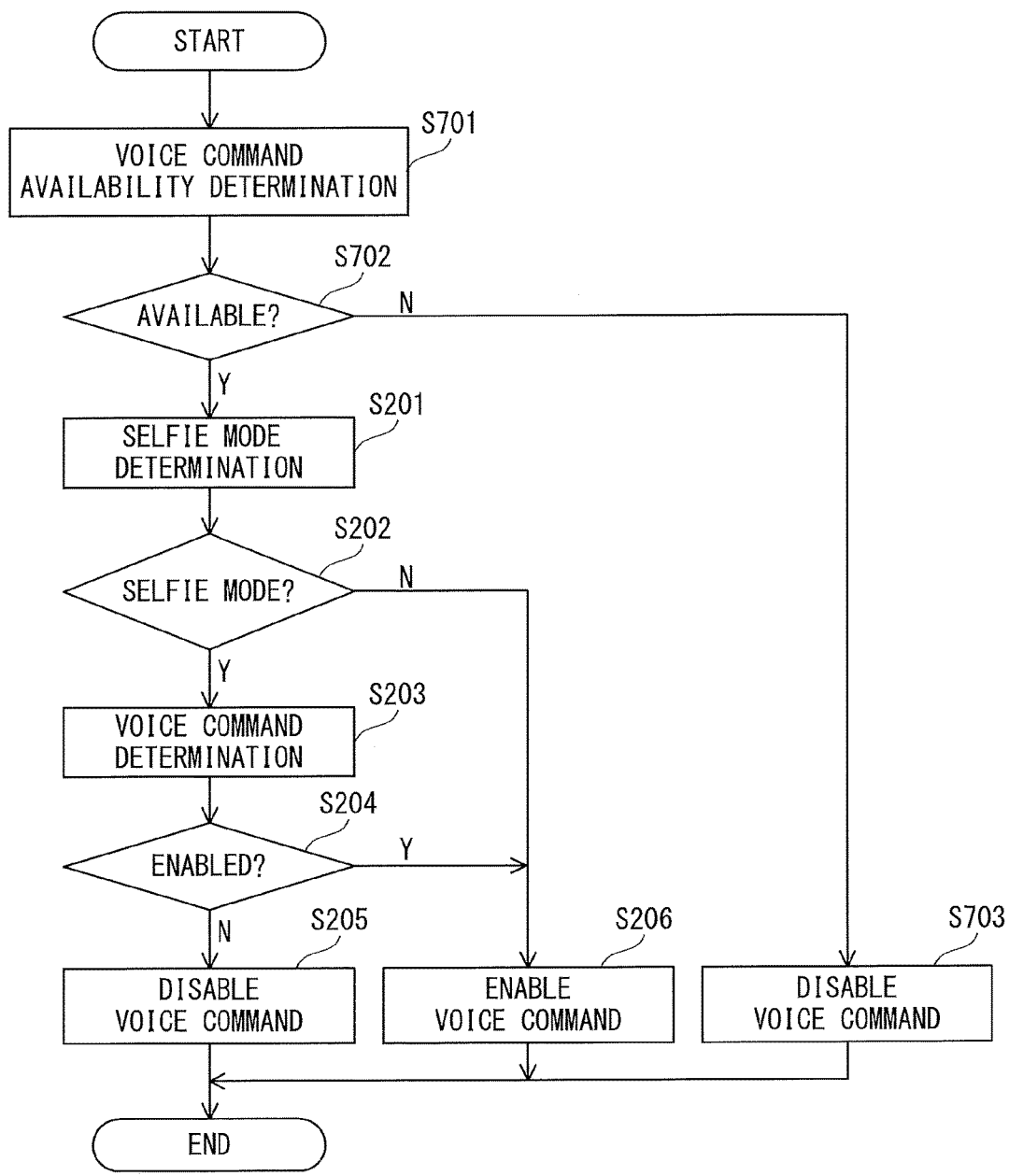
FIG. 10 is a flowchart representing processing to determine whether the voice command function is enabled or not.

It is noted that the voice command function in the imaging apparatus 1 may be switchable between ON/OFF by an operator's intention. In a case where the voice command function itself is set OFF, regardless of whether the selfie mode is set or not, the imaging apparatus 1 disables the voice command function in all the operations. As mentioned, by allowing the operator to choose to stop all the voice command function, the imaging apparatus 1 is easily used even in an environment which is not suitable for using the voice command. The environment which is not suitable for using the voice command includes an environment where is noisy and is difficult to perform voice recognition or, conversely, an environment where is hesitant to make sound. FIG. 10 is a flowchart representing processing to determine whether the voice command function is enabled or not in this case. The same step number is attached to the processing similar to the processing in FIG. 4. A description is omitted with regard to the similar processing.

The CPU 20 determines the availability of the voice command function (S701). With the operation of the operation unit 23, the operator can instruct the availability of the voice command function. Depending on presence/absence of the instruction, the CPU 20 can determine the availability of the voice command function. If it is determined that the voice command function is available (S702: Y), the CPU 20 performs the processing after the Step S201. If it is determined that the voice command function is not available (S702: N), the CPU 20 disables the voice command function and ends the processing (S703).

Through the processing as mentioned, the imaging apparatus 1 can disable the voice command function based on the operator's instruction. Thereby, the imaging apparatus 1 can suppress processing performed by the erroneous recognition of the voice command.

Second Embodiment

In a second embodiment, the imaging apparatus set the voice command function by determining whether the selfie mode is set or not by performing face authentication of the operator.

Figure 11A:
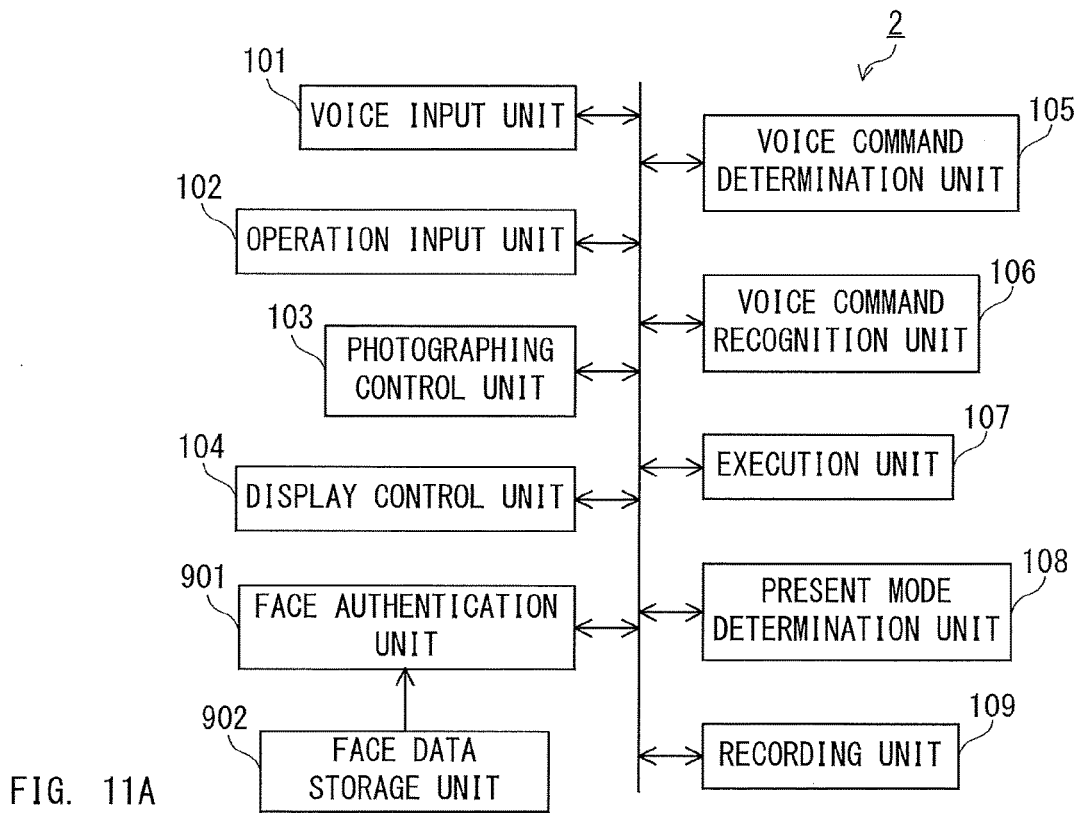
FIGS. 11A and 11B are functional block diagrams of the imaging apparatus.

To this end, the imaging apparatus has a face authentication function. The hardware configuration of the imaging apparatus is similar to that of the first embodiment so that the description thereof is omitted. FIG. 11A is a functional block diagram of an imaging apparatus 2 of the second embodiment.

The same symbols are attached to the functions which are the same as those of the imaging apparatus 1 of the first embodiment shown in FIG. 3. A description of the same function is omitted.

In addition to the components of the imaging apparatus 1 of the first embodiment, the imaging apparatus 2 comprises of the second embodiment comprises a face authentication unit 901 and a face data storage unit 902. The face authentication unit 901 performs face authentication processing using a known face authentication algorithm. A face image which is subjected to the face authentication is a face image included in the image being photographed by the photographing mechanism 25. The face data storage unit 902 stores data of the face image (face data) of the operator of the imaging apparatus 2 (for example, an owner of the imaging apparatus 2). The face data is previously stored in the imaging apparatus 2. The imaging apparatus 2 comprises a rewritable nonvolatile memory for storing the data. The face data storage unit 902 consists of the rewritable nonvolatile memory.

Figure 12A:
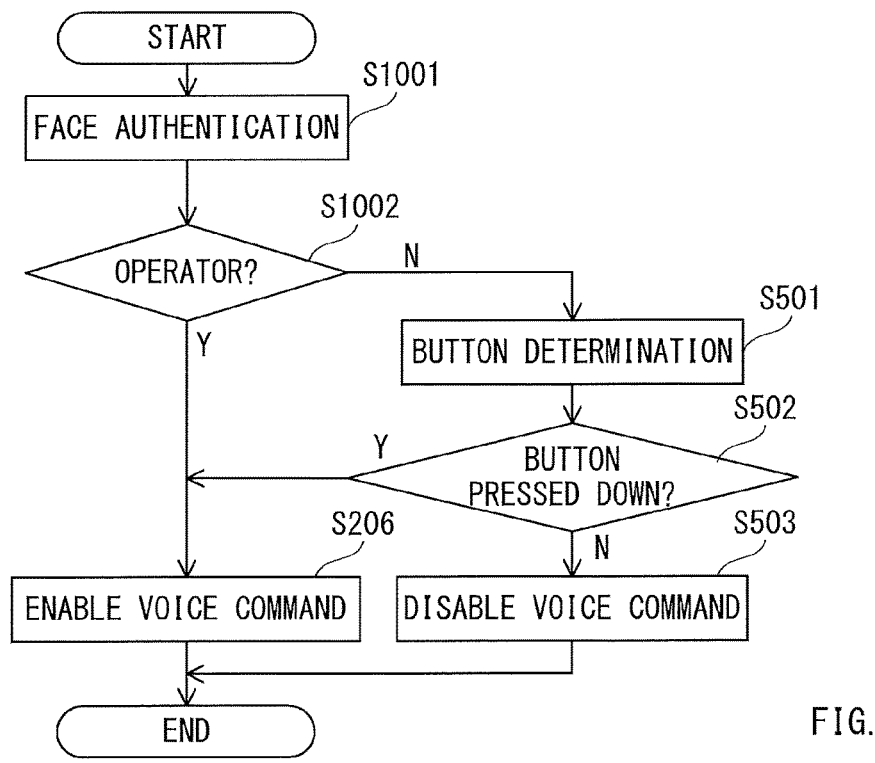
FIGS. 12A and 12B are flowcharts representing processing to determine whether the voice command function is enabled or not.

FIG. 12A is a flowchart representing processing to determine whether the voice command function is enabled or not using the face authentication technology.

When the determination processing of the voice command function is started, the imaging apparatus 2 first performs the face authentication processing by the face authentication unit 901 based on the image being photographed by the photographing mechanism 25 at that time (S1001). The face authentication unit 901 performs the face authentication processing by extracting the face image from the image being photographed by the photographing mechanism 25 and comparing the face data stored in the face data storage unit 902. As the result of the face authentication, if the face image extracted is the face image of the operator (S1002: Y), the CPU 20 determines that the selfie mode is set in the imaging apparatus 2 because the operator is the object. In a case where the operator is the object, the voice command determination unit 105 determines that the selfie mode is set and a condition to enable the voice command function is already satisfied. In other words, by the detection of the operator's face, determination of whether to move to the selfie mode or not and determination of whether to enable the voice command function or not are performed at a time.

When the selfie mode is set, it is deemed that the operator to be the object is already at a position where the photographing is allowable. Therefore, it is not necessary to wait for satisfying the condition, i.e., the operator moves to reach a position where the photographing can be performed, or the condition has already been satisfied.

This is because, when the selfie mode is set, the operator to be the object is already at a position where is able to perform photographing, which can be regarded that it is no longer required that the condition that when the operator moves, photographing can be performed be satisfied, or waiting processing is already finished. The CPU 20 thus enables the voice command function and ends the processing (S206).

As the result of the face authentication, if the face image extracted is not the face image of the operator or the face image cannot be extracted from the image photographed (S1002: Y), the CPU 20 determines that the selfie move is not set in the imaging apparatus 2. In this case, if the voice command function is enabled, there is a possibility that the processing is performed by erroneous recognition of the voice command while, for example, as shown in FIG. 7C, the operator moves to a position where is away from the imaging apparatus 2. Thereby, in a case where an object other than the operator is photographed, the operator operates the voice processing operation button 12 to specify timing to enable the voice command function. When moving to the position where is away from the imaging apparatus 2 in the selfie mode, when the operator's face is recognized, the voice command function is enabled. The CPU 20 determines whether or not an instruction representing that the voice processing operation button 12 is pressed down from the operation input unit 102 (S501). If it is determined that the voice processing operation button 12 is pressed down (S502: Y), the CPU 20 enables the voice command function and ends the processing (S206). If it is determined that the voice processing operation button 12 is not pressed down (S502: N), the CPU 20 disables the voice command function and ends the processing (S503).

As mentioned, by setting the voice command function using the technology of the face authentication of the operator, the imaging apparatus 2 can suppress processing performed by the erroneous recognition of the voice command.

Third Embodiment

There is an imaging apparatus which is configured to allow the display 16 provided on the back surface to direct to the front surface side. It is also possible to use the apparatus with two photographing mechanisms 25, such as the smartphones, as the imaging apparatus. With the imaging apparatus of these configurations, the operator can perform self-photographing while checking himself through the display 16 so that it is unlikely that the operator fails photographing.

Figure 13A:
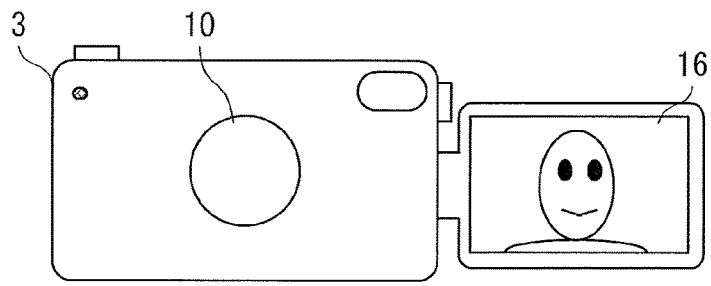
FIGS. 13A to 13D are explanatory diagrams of the imaging apparatus.
Figure 13B:
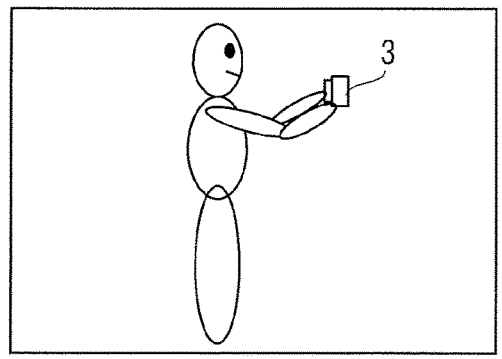
Figure 13C:
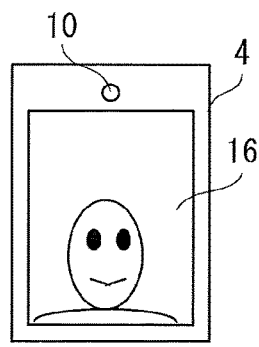
Figure 13D:
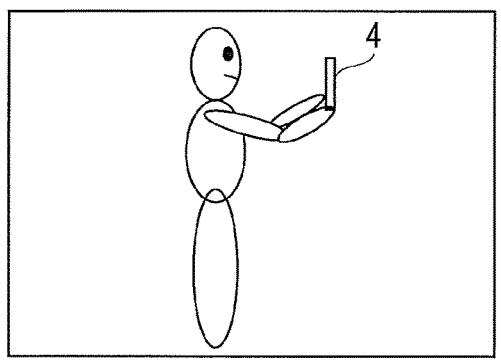

FIGS. 13A to 13D are explanatory diagrams of the imaging apparatus which allows the operator to check himself when the operator performs self-photographing. FIG. 13A is a diagram illustrating an imaging apparatus 3 which can change a direction of the display 16. FIG. 13B represents a state when the self-photographing is performed with the imaging apparatus 3. FIG. 13C is a diagram illustrating an imaging apparatus 4 with two photographing mechanisms 25, one provided on a surface on which the display 16 of the main body is provided (front surface), and the other provided on a surface opposite to the front surface (back surface). FIG. 13D represents a state when the self-photographing is performed with the imaging apparatus 4. When the self-photographing is performed, the operator's face is displayed on the display 16.

Figure 11B:
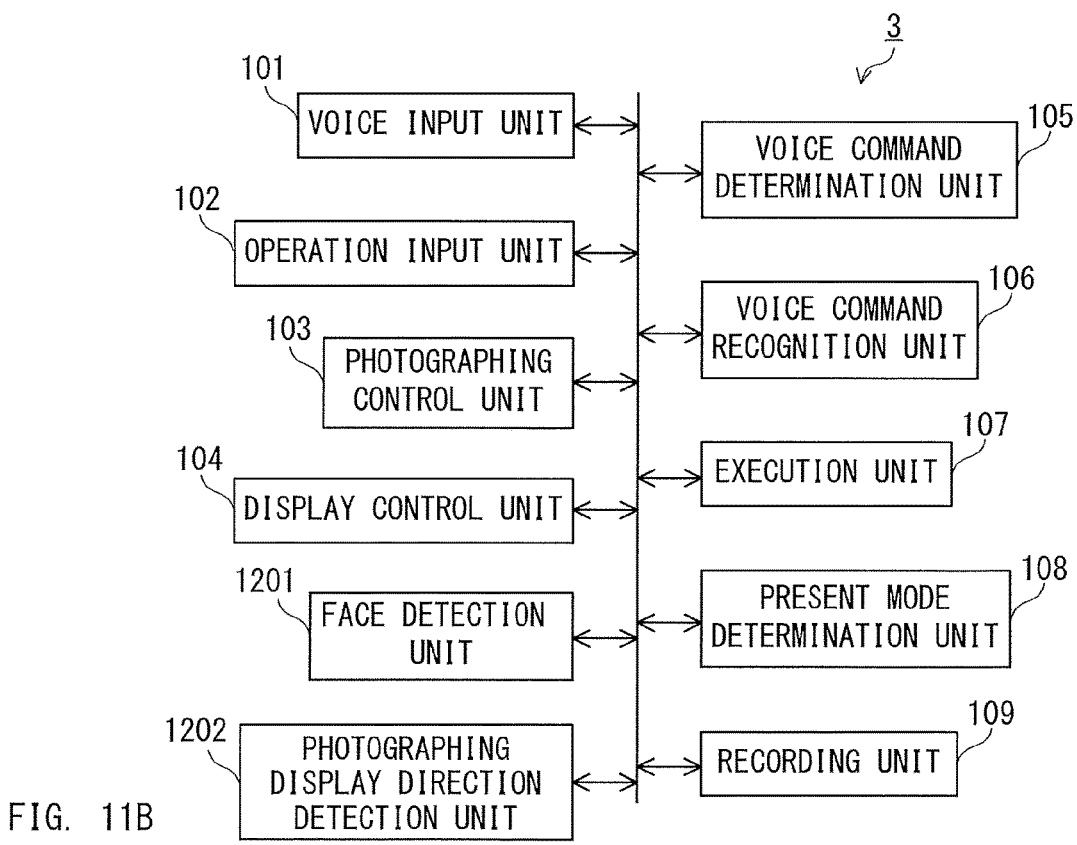

When the self-photographing is performed, the photographing mechanism 25 (lens 10) and the display 10 of the imaging apparatuses 3 and 4 are directed to the same direction. The imaging apparatuses 3 and 4 can thus determine whether the selfie mode is set in the imaging apparatus 3 and in the imaging apparatus 4 by checking the direction of the photographing mechanism 25 and the direction of the display 16. FIG. 11B is the functional block diagram of the imaging apparatus to for the determination. FIG. 11B shows a functional block of the imaging apparatus 3, which is similar to the functional block of the imaging apparatus 4. The same symbols are attached to the functions which are the same as those of the imaging apparatus 1 of the first embodiment shown in FIG. 3. A description of the same function is omitted. It is noted that the hardware configuration of the imaging apparatuses 3 and 4 is similar to that of the first embodiment so that the description thereof is omitted.

In addition to the components of the imaging apparatus 1 of the first embodiment, the imaging apparatus 3 comprises a face detection unit 1201 and a photographing display direction detection unit 1202. The face detection unit 1201 detects a face image from the image being photographed by the photographing mechanism 25 using a known face image detection algorithm. The photographing display direction detection unit 1202 determines whether the photographing mechanism 25 (lens 10) and the display 16 are directed to the same direction or not.

The imaging apparatus 3 of FIG. 13B provides a movable detection part for detecting a movable state, such as a sensor or a switch, on a movable part of the display 16. Depending on a state of the movable detection part, the photographing display direction detection unit 1202 detects whether the photographing mechanism 25 (lens 10) and the display 16 are directed to the same direction or not.

The imaging apparatus 4 of FIG. 13D comprises the photographing mechanism 25 on each of the front surface and the back surface of the main body. Depending on the surface on which the photographing mechanism 25 (lens 10) which is actually performing photographing, the photographing display direction detection unit 1202 detects whether the photographing mechanism 25 (lens 10) and the display 16 are directed to the same direction or not. Further, a gravity sensor may respectively be provided on the photographing mechanism 25 (lens 10) and the display 16. Then, according to the measuring result, the photographing display direction detection unit 1202 may detect whether the photographing mechanism 25 (lens 10) and the display 16 are directed to the same direction or not.

Figure 12B:
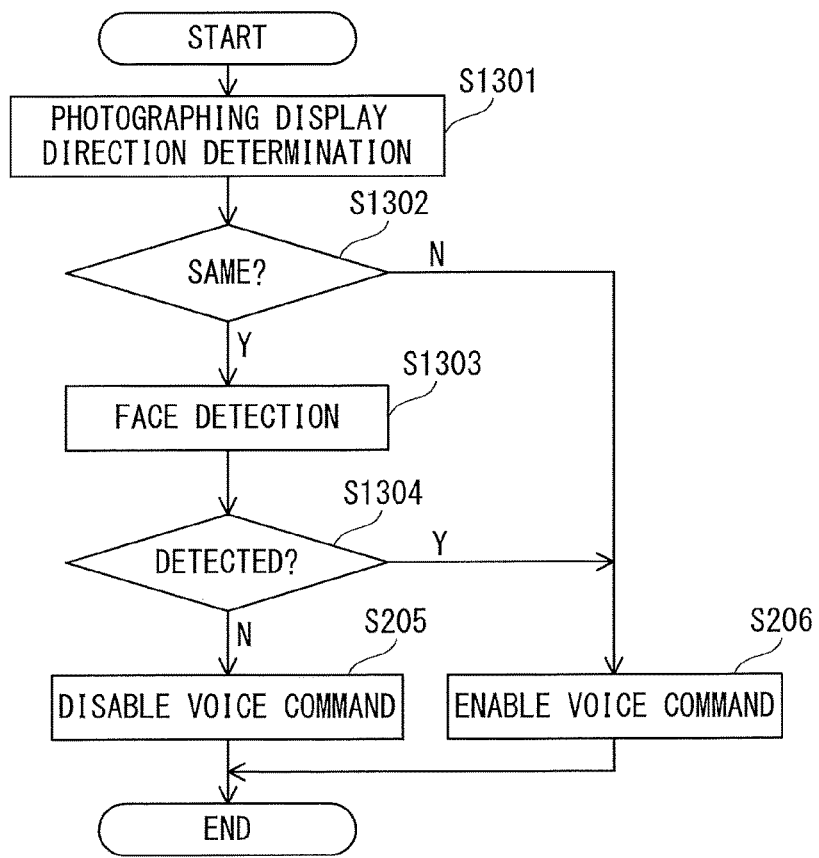

FIG. 12B is a flowchart representing processing to determine whether the voice command function is enabled or not depending on the direction of the photographing mechanism 25 (lens 10) and the display 16. In this processing, the imaging apparatus determines whether the selfie mode is set or not based on whether the photographing mechanism 25 and the display 16 are directed to the same direction or not. Further, the imaging apparatus 3 determines the setting of the voice command function according to the result of the face detection.

When the determination processing of the voice command function is started, the imaging apparatus 3 first determines, by the photographing display direction detection unit 1202, whether the photographing mechanism 25 and the display 16 are directed to the same direction or not (S1301). The photographing display direction detection unit 1202 may determine whether the photographing mechanism 25 and the display 16 are directed to the same direction or not based on whether the operator is included in a photographing range of the photographing mechanism 25.

If it is determined that the photographing mechanism 25 and the display 16 are not directed to the same direction (S1302: N), the present mode determination unit 108 determines that the selfie mode is not set. In this case, the CPU 20 enables the voice command function and ends the processing (S206).

If it is determined that the photographing mechanism 25 and the display 16 are directed to the same direction (S1302: Y), the present mode determination unit 108 determines that the selfie mode is set. In this case, the face detection unit 1201 detects a face image from the image being photographed by the photographing mechanism 25 at that time (S1303). In a case where the face detection unit 1201 detects the face image (S1304: Y), the voice command determination unit 105 determines that the condition to enable the voice command function is satisfied. Then, the CPU 20 enables the voice command function and ends the processing (S206). In a case where the face detection unit 1201 does not detect the face image (S1304: N), the CPU 20 disables the voice command function and ends the processing (S205). It is noted that the face detection unit 1201 may detect the face image only when the face of the object is facing to the front and is detectable.

Through the above-mentioned processing, for example, by first setting the selfie mode through the operation unit 23 by the operator and then, performing the processing after the Step S1301, the imaging apparatus 3 can disable the voice command function until the face of the object is photographed. Due to the above, the imaging apparatus 3 can suppress processing performed by the erroneous recognition of the voice command for a period until the operator enters the photographing range from setting the selfie mode.

Figure 14A:
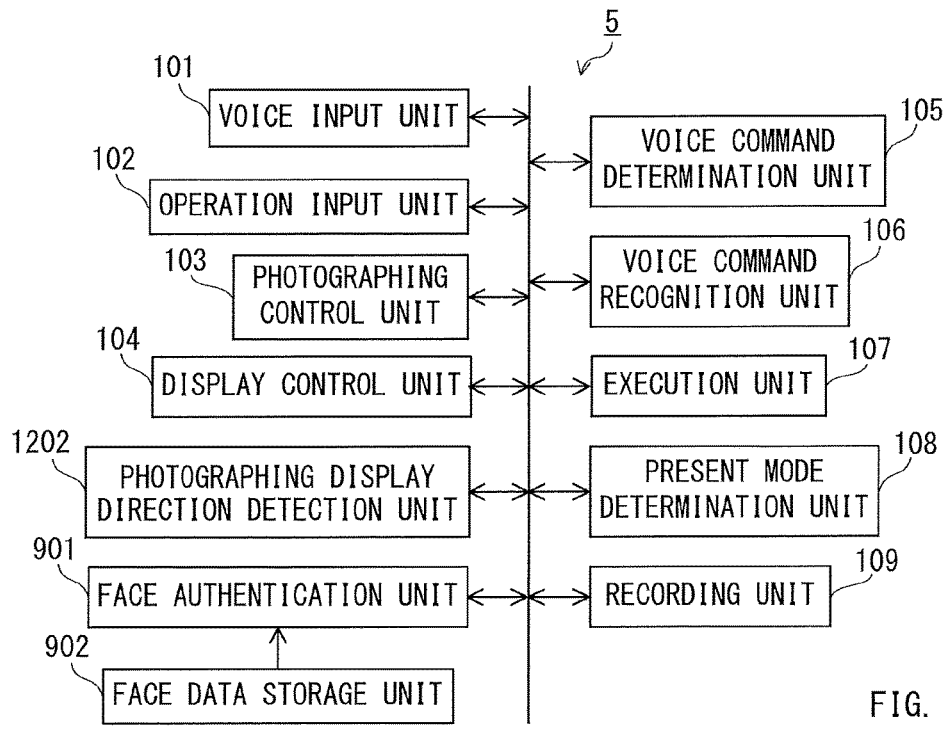
FIGS. 14A and 14B are functional block diagrams of the imaging apparatus.

It is noted that, instead of simply detecting the face image, the imaging apparatus 3 may enable the voice command function in a case where the face image detected is the face image of the operator. FIG. 14A is a functional block diagram of an imaging apparatus 5 when performing the face authentication. The face detection unit 1201 of the imaging apparatus 3 in FIG. 11B is replaced with the face authentication unit 901 and the face data storage unit 902, which is the functional block of the imaging apparatus 5. A description of each configuration is omitted.

Figure 15A:
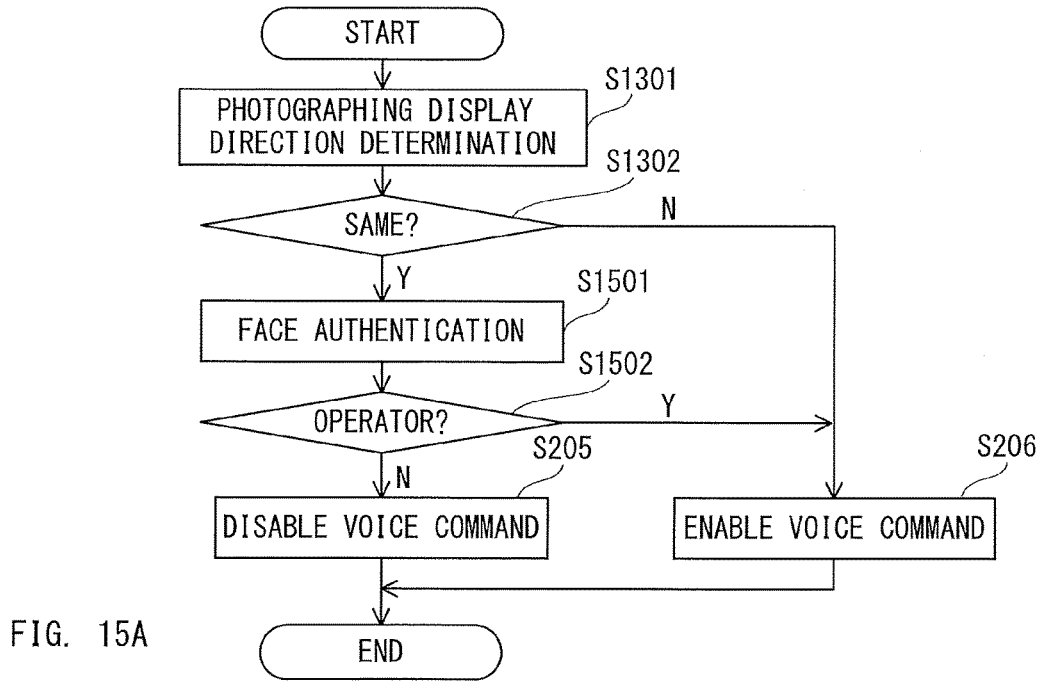
FIGS. 15A and 15B are flowcharts representing processing to determine whether the voice command function is enabled or not.

FIG. 15A is a flowchart representing processing to determine whether the voice command function is enabled or not by the imaging apparatus 5. The same step number is attached to the processing similar to the processing in FIG. 12B. A description is omitted with regard to the similar processing.

If it is determined that the photographing mechanism 25 and the display 16 are directed to the same direction (S1302: Y), the present mode determination unit 108 determines that the selfie mode is set. In this case, the face authentication unit 901 performs the face authentication processing by extracting the face image from the image being photographed by the photographing mechanism 25 and comparing the face data stored in the face data storage unit 902 (S1501). As the result of the face authentication processing, if the face image extracted is the face image of the operator (S1502: Y), the CPU 20 enables the voice command function and ends the processing (S206). As the result of the face authentication processing, if the face image of the operator is not authenticated (S1502: N), the CPU 20 disables the voice command function and ends the processing (S205).

By performing the face authentication, the imaging apparatus 5 can surely restrict timing to enable the voice command function as compared to the case where simply performs the face detection. Due to the above, the imaging apparatus 5 can suppress processing performed by the erroneous recognition of the voice command for a period until the operator enters the photographing range from setting the selfie mode.

Forth Embodiment

Figure 14B:
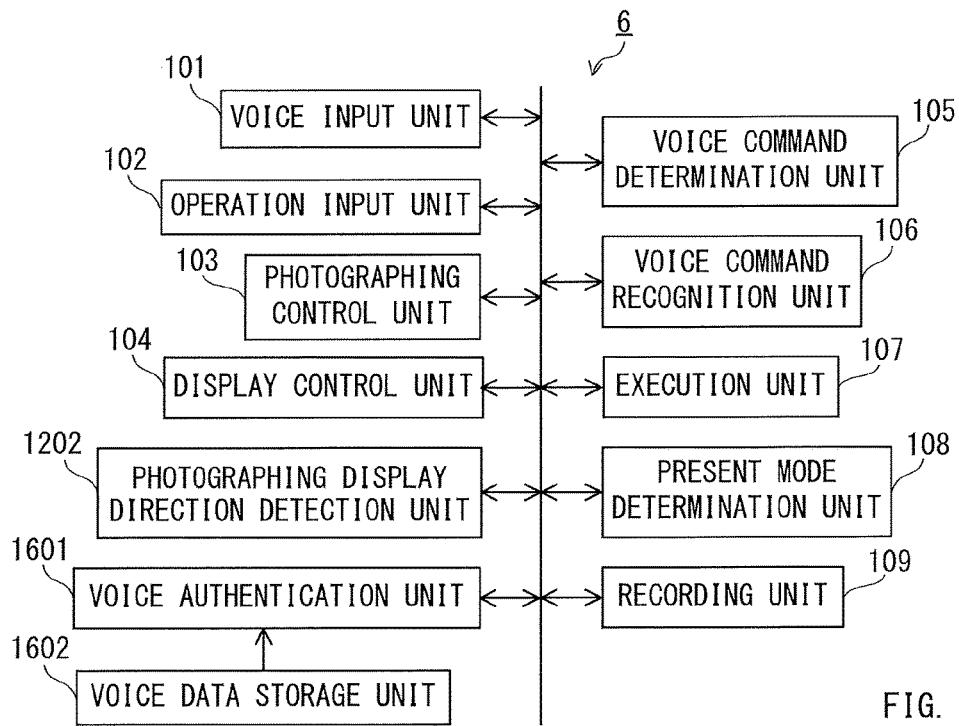

It is also possible to determine whether the voice command function is enabled or not with the operator's voice. FIG. 14B is a functional block diagram of an imaging apparatus 6 for determining the voice command function using the operator's voice. The face detection unit 1201 of the imaging apparatus 3 in FIG. 11B is replaced with a voice authentication unit 1601 and a voice data storage unit 1602, which is the functional block of the imaging apparatus 6.

The voice authentication unit 1601 performs authentication of a speaker by voice authentication processing using a known voice recognition algorithm. A sound subjected to the authentication of the speaker is collected by the microphone 14. The voice data storage unit 1602 stores voice data of the operator of the imaging apparatus 6 (for example, an owner of the imaging apparatus 6). The voice data is previously stored in the imaging apparatus 6. The imaging apparatus 6 comprises a rewritable nonvolatile memory for storing the data. The voice data storage unit 1602 consists of the rewritable nonvolatile memory.

Figure 15B:
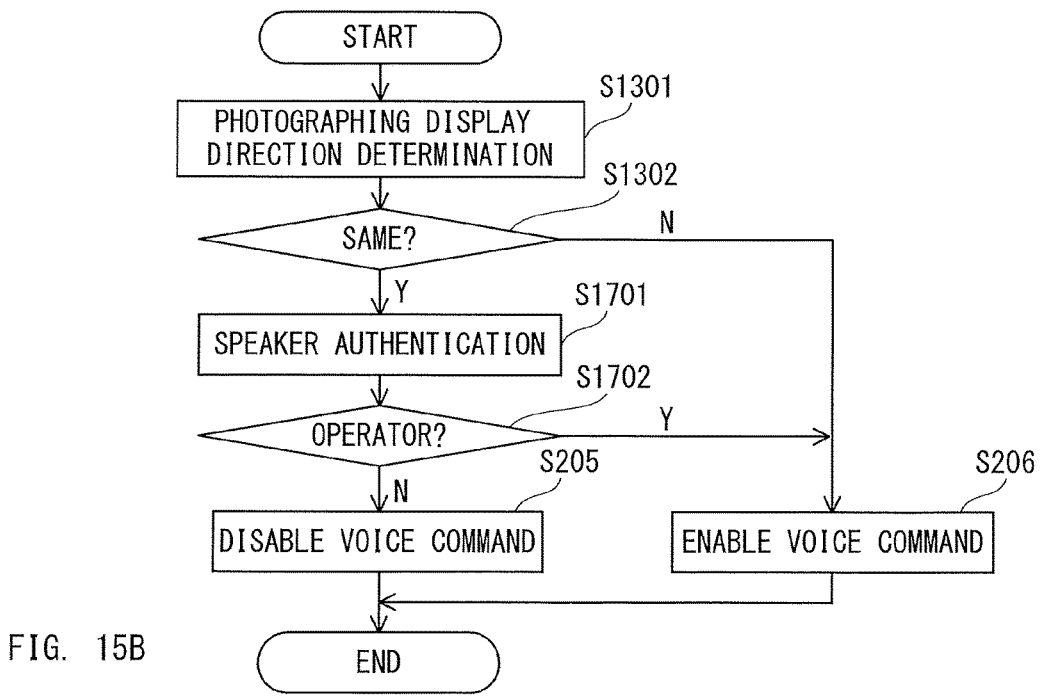

FIG. 15B is a flowchart representing processing to determine whether the voice command function is enabled or not using the voice recognition technology. The same step number is attached to the processing similar to the processing in FIG. 12B. A description is omitted with regard to the similar processing.

If it is determined that the photographing mechanism 25 and the display 16 are directed to the same direction (S1302: Y), the present mode determination unit 108 determines that the selfie mode is set. In this case, the voice authentication unit 1601 performs speaker authentication processing by comparing the sound collected by the microphone 14 with the voice data stored in the voice storage unit 1602 (S1701). As the result of the speaker authentication processing, if the sound collected is the voice of the operator (S1702: Y), the CPU 20 enables the voice command function and ends the processing (S206). As the result of the speaker authentication processing, if the sound input is not the voice of the operator (S1702: N), the CPU 20 disables the voice command function and ends the processing (S205).

Through the speaker authentication processing, more ensured authentication of the operator is obtained as compared to the face authentication processing. Thereby, the imaging apparatus 6 can surely restrict timing to enable the voice command function. Due to the above, the imaging apparatus 6 can suppress processing performed by the erroneous recognition of the voice command for a period until the operator enters the photographing range from setting the selfie mode. It is noted that, in addition to the face authentication and the speaker authentication, the imaging apparatus 6 may determine whether the voice command function is enabled or not by a gesture detection technology which detects motion of a hand of the object or a posture detection technology which detects a posture of the object.

Fifth Embodiment

There is a case where a state that whether the condition to enable the voice command function (see Step S203 in FIG. 4) is satisfied or not is changed after the voice command function is enabled. Even the condition to enable the voice command function is no longer satisfied, there is a case where the operator finds it easy to use to enable the voice command function only for a predetermined time period. For example, in a case where the voice command function is enabled while the operator's face is being authenticated (see FIG. 15A), sometimes, the operator hides his face from the imaging apparatus after the face authentication. This is, for example, when the operator turns his back to the imaging apparatus or hides his face with a board etc. In this case, the operator becomes unavailable to use the voice command function. Due to the above, in the fifth embodiment, the imaging apparatus enables the voice command function only for a fixed time period even in a case where the condition to enable the voice command function is no longer satisfied. In the fifth embodiment, processing is performed using the imaging apparatus 1 of the first embodiment.

Figure 16:
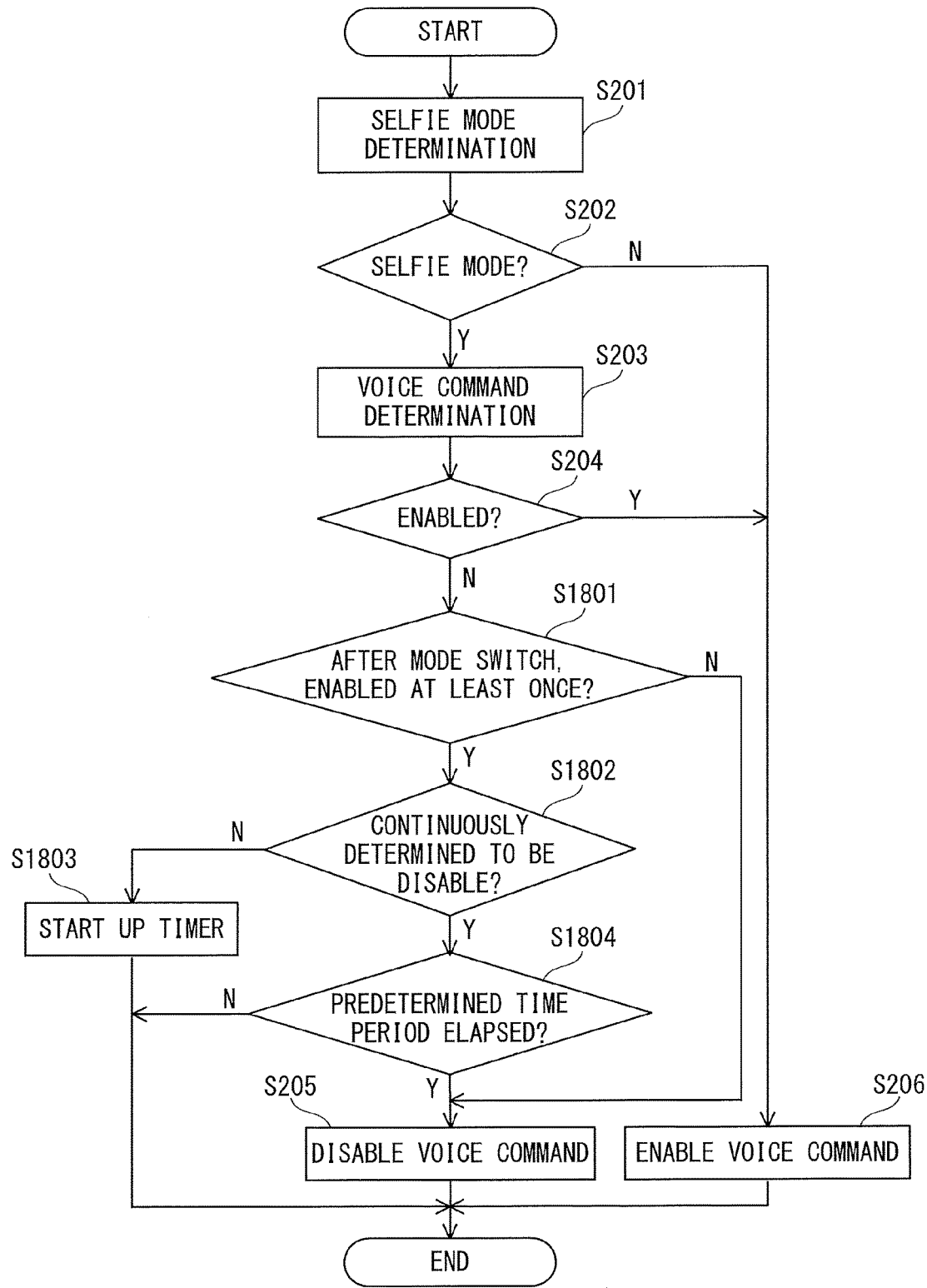
FIG. 16 is a flowchart representing processing to determine whether the voice command function is enabled or not.

FIG. 16 is a flowchart representing processing to determine whether the voice command function is enabled or not of the fifth embodiment. The same step number is attached to the processing similar to the processing in FIG. 4 of the first embodiment. A description of the similar processing is omitted. The processing in FIG. 16 is repeatedly performed and the voice command function is enabled or disabled every time the processing is performed.

If the condition to enable the voice command function is not satisfied (S204: N), the CPU 20 determines whether the voice command function was enabled or not after determining the selfie mode in the Step S202 (S1801). This is to prevent the voice command function from being enabled for a fixed time period immediately after setting the selfie mode.

If it is determined that the voice command function has never been enabled (S1801: N), the CPU 20 disables the voice command function and ends the processing (S205). If it is determined that the voice command function is enabled at least once (S1801: Y), the CPU 20 determines whether it is continuously determined that the voice command function is disabled or not (S1802). If it is determined that the voice command function immediately before is enabled (S1802: N), the CPU 20 starts up a timer to measure time when the voice command function is disabled and ends the processing (S1803). If it is determined that the voice command function immediately before is disabled (S1802: Y), the CPU 20 checks the timer and determine whether a predetermined time period has elapsed or not after the voice command function is disabled (S1804).

If it is determined that the predetermined time has elapsed (S1804: Y), the CPU 20 disables the voice command function and ends the processing (S205). If it is determined that the predetermined time is not elapsed (S1804: N), the CPU does not change the voice command function and ends the processing.

As mentioned, the imaging apparatus can enable the voice command function only for the predetermined time period even the condition to enable the voice command function is no longer satisfied after the voice command function is once enabled. Due to the above, the imaging apparatus can prevent processing performed by the erroneous recognition of the voice command function and improve the usability of the operator.

There is a case where the voice command function is continuously enabled. This includes a case where performs the face detection to determine whether the voice command function is enabled or not. In such a case, by a detection of a passenger's face for a moment, for example, the voice command function is continuously enabled. This results in improving a possibility of processing performed by the erroneous recognition of the voice command. Therefore, in a case where the voice command function is continuously enabled for a predetermined time period, the imaging apparatus may enable the voice command function.

Figure 17:
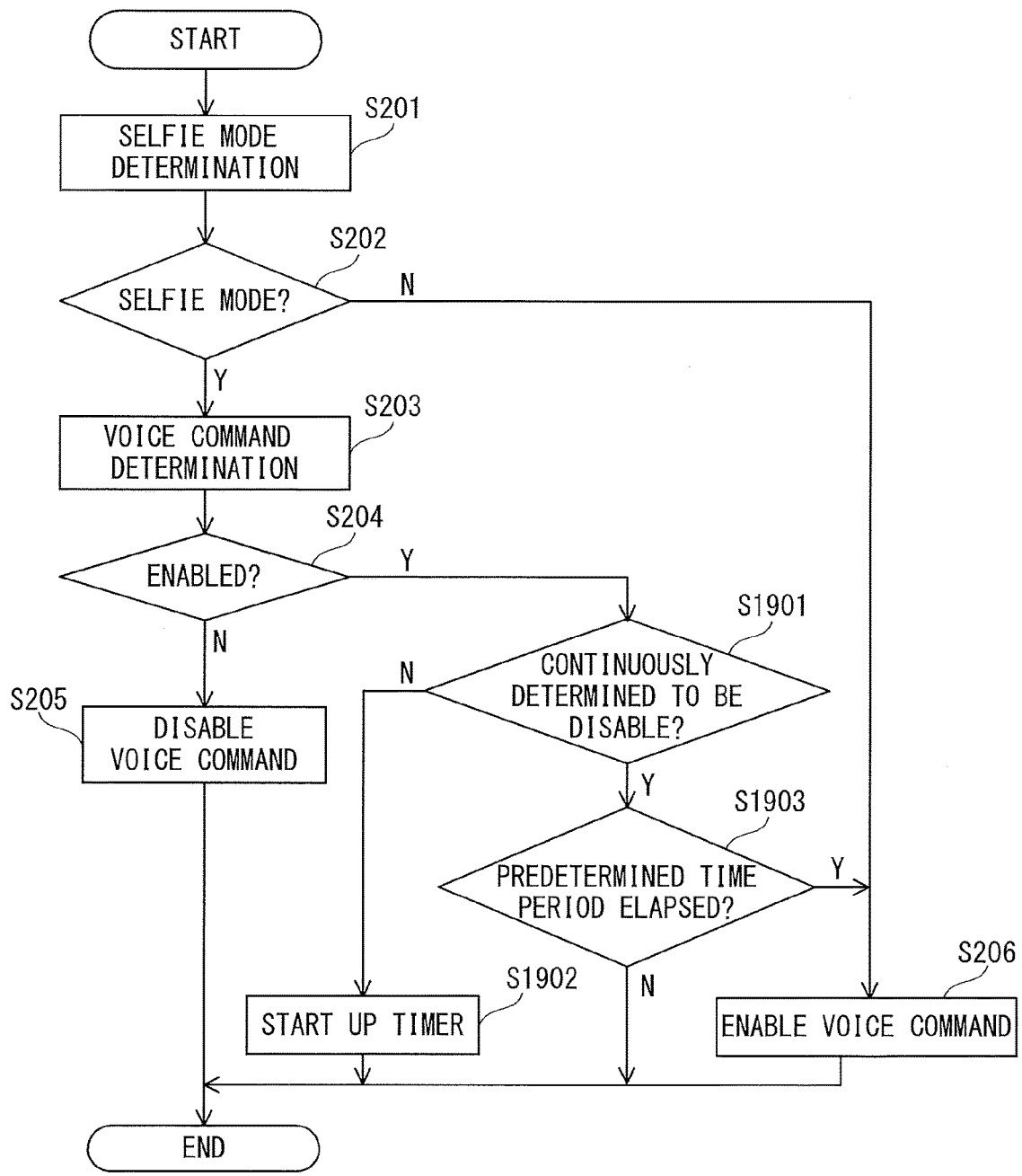
FIG. 17 is a flowchart representing processing to determine whether the voice command function is enabled or not.

FIG. 17 is a flowchart representing processing to determine whether the voice command function is enabled or not in this case. The same step number is attached to the processing similar to the processing in FIG. 4 of the first embodiment. A description is omitted with regard to the similar processing. The processing in FIG. 17 is repeatedly performed and the voice command function is enabled or disabled every time the processing is performed.

If it is determined that the condition to enable the voice command function is satisfied (S204: Y), the CPU 20 determines whether the condition is continuously satisfied or not (S1901). If it is determined that the condition for the voice command function is not continuously satisfied (S1901: N), the CPU 20 starts up the timer to measure time when the condition to enable the voice command function is enabled and ends the processing (S1902). If it is determined that the condition for the voice command function is continuously satisfied (S1901: Y), the CPU 20 checks the timer and determines whether the predetermined time period has elapsed or not after the condition to enable the voice command function is satisfied (S1903). If it is determined that the predetermined time has elapsed (S1903: Y), the CPU 20 enables the voice command function and ends the processing (S206). If it is determined that the predetermined time period is not elapsed (S1803: N), the CPU does not change the voice command function and ends the processing.

It is noted that, even the condition to enable the voice command function is no longer satisfied after the voice command function is once enabled; it is possible to combine and use the processing in FIG. 16, in which the voice command function is enabled for the predetermined time period. As mentioned, by enabling the voice command function in the case where the voice command function is maintained to be available for a predetermined time, the imaging apparatus can reduce the possibility of processing performed by the erroneous recognition of the voice command function than before.

Sixth Embodiment

As shown in FIG. 1, in a case where the two microphones 14, the front-side microphone 14a and the back-side microphone 14b, are provided, one may be assigned for a microphone for photographing the moving image and the other may be assigned for a microphone for collecting sound of the voice command function. FIGS. 18A to 18D are diagrams illustrating cases where the back-side microphone 14b, provided on the same surface as the display surface of the display 16, is assigned for a microphone for collecting sound of the voice command.

Figure 18A:
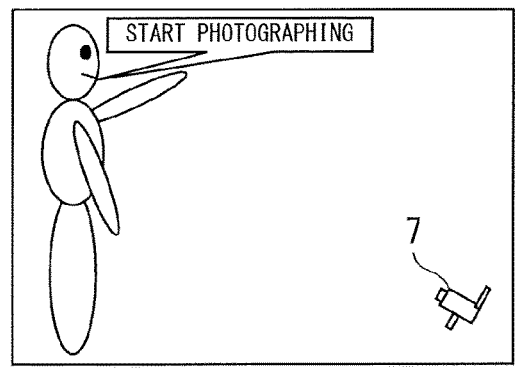
FIGS. 18A to 18D are diagrams illustrating cases where assigns back-side microphone for a microphone for collecting sound of the voice command.
Figure 18B:
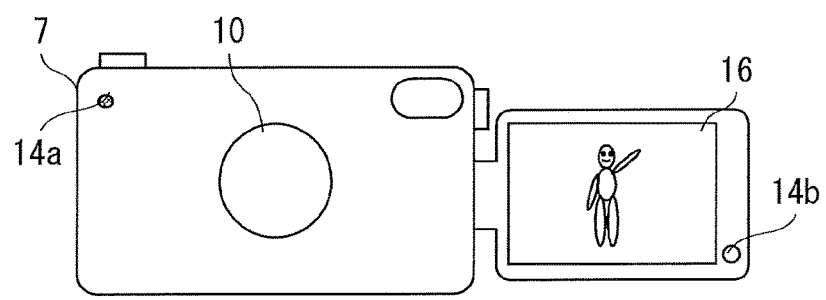

FIG. 18A represents a state where the operator directs an imaging apparatus 7 toward the operator himself and photographs the operator himself. FIG. 18B is a diagram illustrating a front surface of the imaging apparatus 7 in a state of FIG. 18A. The operator being photographed is displayed on the display 16 as an object. The back-side microphone 14b, assigned for the microphone for collecting sound of the voice command, is provided near the display 16. The display 16 is directed to the operator so that the back-side microphone 14b is also directed to the operator. Also, the front-side microphone 14a, assigned for the microphone for photographing the moving image, is directed to the operator who is the object.

Figure 18C:
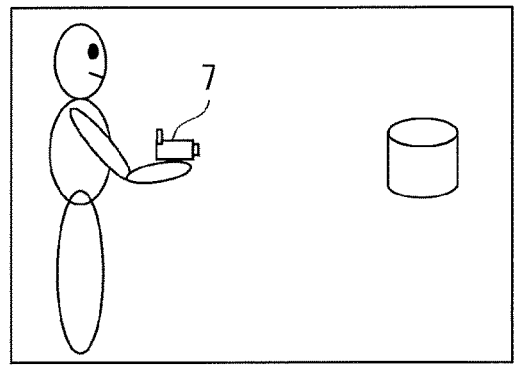
Figure 18D:
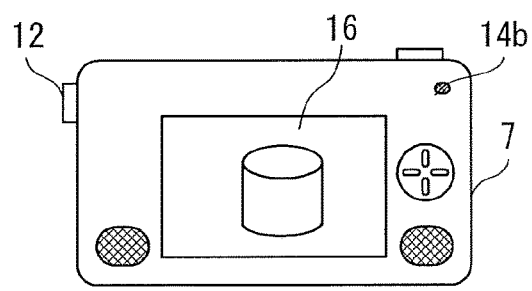

FIG. 18C represents a state where the operator holds the imaging apparatus 7 and photographs the object other than the operator himself. FIG. 18D is a diagram illustrating a back surface of the imaging apparatus 7 in a state of FIG. 18C. The object being photographed is displayed on the display 16. The back-side microphone 14b, assigned for the microphone for collecting sound of the voice command, is provided near the display 16. The display 16 is directed to the operator so that the back-side microphone 14b is also directed to the operator. Also, the front-side microphone 14a (not shown) assigned for the microphone for photographing the moving image is directed to the operator who is the object.

As mentioned, the microphone for collecting sound of the voice command (the back-side microphone 14b) is directed to the operator and the microphone for photographing the moving image (the front-side microphone 14a) is directed to the object. It is noted that the microphone for collecting sound for the voice command function (the back-side microphone 14b) may be a unidirectional microphone which avoids as far as possible picking up a sound. The microphone for photographing the moving image (the front-side microphone 14a) may be the one which is switchable between omnidirectional, which picks up whole sound, and unidirectional, which picks up sound directed only to the object.

Figure 19:
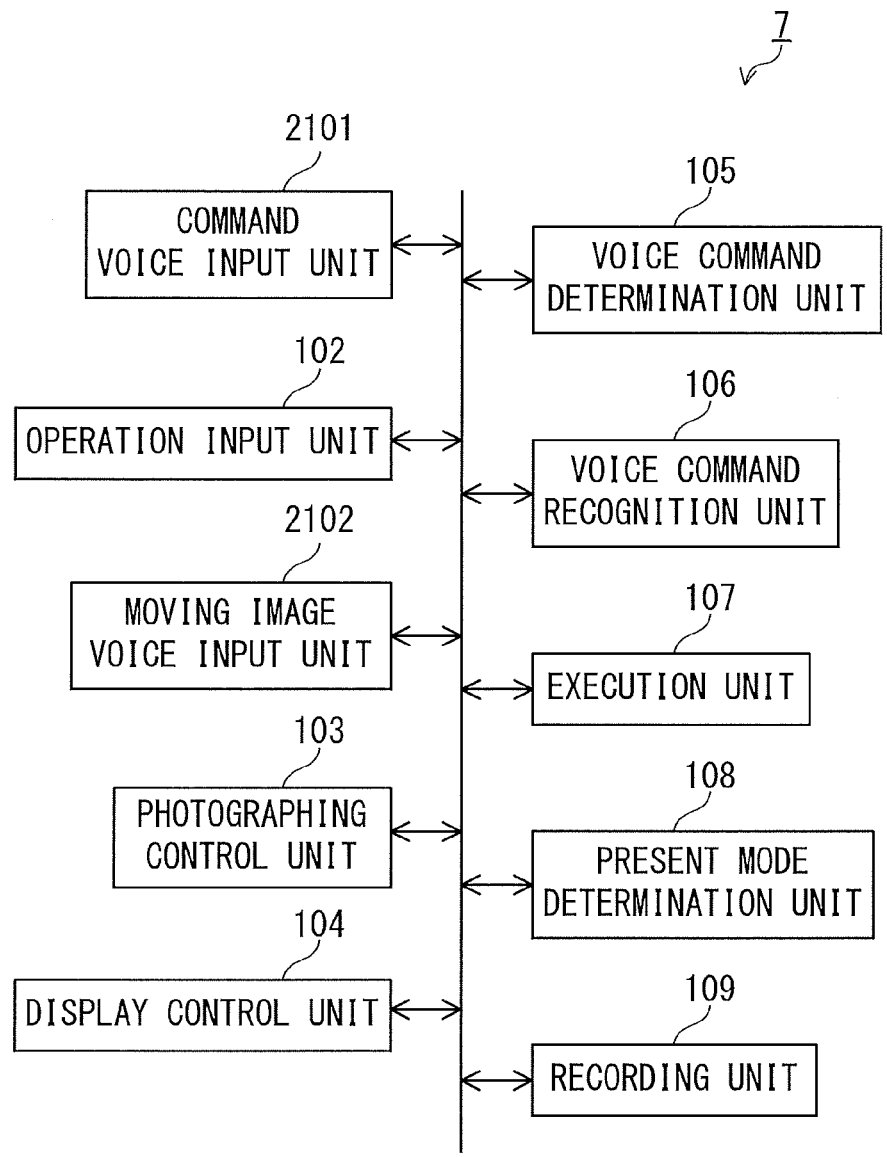
FIG. 19 is a functional block diagram of the imaging apparatus.

FIG. 19 is the functional block diagram of the imaging apparatus 7 in this case. The voice input unit 101 of the imaging apparatus 1 in FIG. 3 is replaced with a command voice input unit 2101 and a moving image voice input unit 2102, which is the functional block of the imaging apparatus 7. Other functions are the same and the same symbols are attached. A description of the same function is omitted. When the voice command function is enabled, the command voice input unit 2101 receives voice collected by the microphone 14 as the voice command. The moving image voice input unit 2102 receives voice collected by the microphone 14 when photographing the moving image as the voice for recording.

Figure 20:
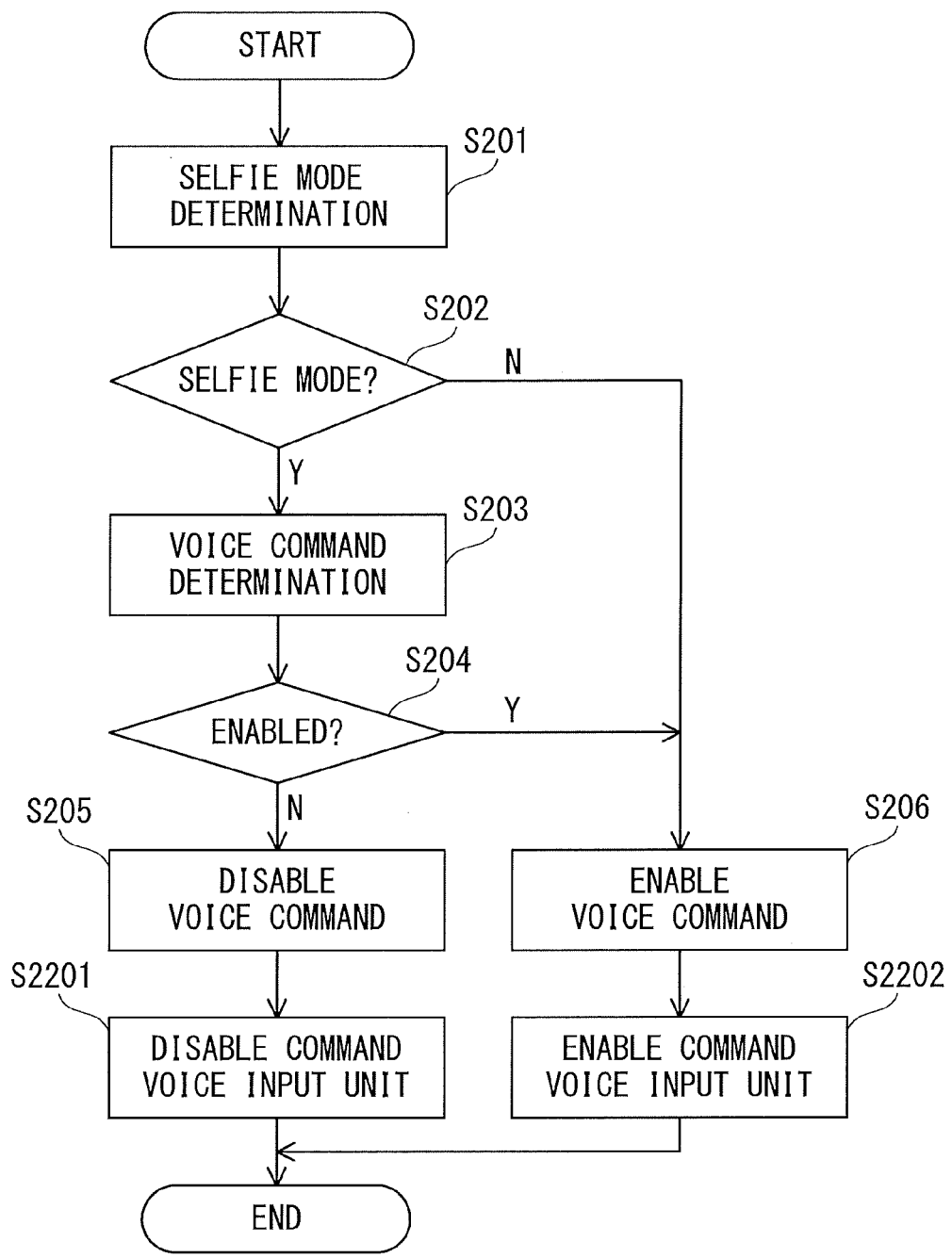
FIG. 20 is a flowchart representing processing to determine whether the voice command function is enabled or not.

FIG. 20 is a flowchart representing processing to determine whether the voice command function is enabled or not by the imaging apparatus 7. The same step number is attached to the processing similar to the processing in FIG. 4 of the first embodiment. A description is omitted with regard to the similar processing.

When the voice command function is disabled, the CPU 20 disables the function of the command voice input unit 2101 (S2201). The CPU 20 may disable the microphone assigned for collecting the voice command by disabling the function of the command voice input unit 2101. When the voice command function is enabled, the CPU 20 enables the function of the command voice input unit 2101 (S2202). The CPU 20 enables the microphone assigned for collecting the voice command by enabling the function of the command voice input unit 2101.

As mentioned, when the voice command function is disabled, the imaging apparatus 7 disables the part and function to collect the voice command, which reduces the possibility of processing performed by the erroneous recognition of the voice command than before.

Seventh Embodiment

It is assumed that, in a case where the selfie mode is set and the voice command function is enabled, when the operator utters from a long distance, S/N ratio with background sound becomes large. Also, in the selfie mode, the operator often utters toward the imaging apparatus, which results in the improving possibility that the imaging apparatus erroneously recognizes the voice command. Then, in the case where the selfie mode is set, the imaging apparatus uses the voice command which is different from the voice command used when the imaging apparatus is in the other operation mode.

For example, the voice command used for the selfie mode is made longer as compared to the voice command used when the imaging apparatus is in the other operation mode to reduce possibility of causing erroneous recognition. FIG. 21A represents an example of the voice command which is made longer. In FIG. 21A, a keyword "camera" is added before the voice command when the imaging apparatus is in the other operation mode.

For example, the imaging apparatus 1 stores a table for the voice command used when the selfie mode is set and a table for the voice command used when the selfie mode is not set in the RAM 21. Each table represents a relation of processing associated with each voice command. The voice command recognition unit 106 performs the voice recognition processing using one table when the selfie mode is set, and performs the voice recognition processing using the other table when the selfie mode is not set. The execution unit 107 executes the processing associated with the voice command according to the result of the voice recognition.

Also, the tolerance of the erroneous recognition may be set depending on the influence of processing performed by the erroneous recognition given to the operator. The tolerance of the erroneous recognition is set high as the command with less influence of processing. For example, even when the voice command meaning "start photographing" is erroneously recognized, what is required is to simply cancel the voice command, which gives less influence. On the other hand, when the command meaning "finish photographing" is erroneously recognized, there is a possibility that the photographing is finished at a timing not intended by the operator. So, the operator is required to rephotograph the photographing contents from the beginning, which gives significant influence. Thereby, the tolerance of the voice command with significant influence is set low to make it hard to be recognized as the voice command.

FIG. 21B is an explanatory diagram of the tolerance. The tolerance is set for every voice command. In FIG. 21B, the tolerance is represented as "high", "middle", and "low", which is represented by a numerical value. For example, the imaging apparatus 1 stores a table including the processing associated with every voice command and the tolerance of the erroneous recognition in the RAM 21. The imaging apparatus 1 uses likelihood information generated as the recognition result by the voice recognition by the voice command recognition unit 106 and calculates likelihood difference between a first and a second of the recognition result. The likelihood difference is represented by a numeric value. The execution unit 107 executes the processing associated with the voice command recognized if the likelihood difference is equal to or higher than the numeric value of the tolerance. The execution unit 107 does not execute the processing associated with the voice command recognized if the likelihood difference is not equal to or higher than the numeric value of the tolerance. The higher the tolerance is, the smaller the likelihood difference becomes. The lower the tolerance is, the larger the likelihood difference becomes.

As mentioned, by preparing the voice command for the selfie mode, the possibility of processing performed by the erroneous recognition of the voice command is reduced. Also, by setting the tolerance to the voice command, influence given to the operator due to the erroneous recognition can be reduced.

The first embodiment to the seventh embodiment as mentioned may appropriately be combined. In the imaging apparatus as mentioned, in the case where the selfie mode is set, the voice command function is enabled or disabled depending on whether the condition to enable the voice command function is satisfied or not. Thereby, the possibility of erroneously recognizing the voice command function is reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-259197, filed Dec. 22, 2014, which is hereby incorporated by reference wherein in its entirety.

What is claimed is:

1. An imaging apparatus comprising:
a photographing unit configured to perform photographing;
a sound collection unit configured to collect voice;
a determination unit configured to determine whether a condition to enable a voice command function, which executes predetermined processing according to a voice associated with the predetermined processing, is satisfied in a case where a selfie mode is set, the selfie mode being an operation mode for photographing, by an operator, the operator himself with the photographing unit; and
a control unit configured, in a case where the selfie mode is not set, to enable the voice command function, and configured, in a case where the selfie mode is set, to enter a state in which the voice command function is disabled, and thereafter, based on a determination result of the determination unit which indicates a change from a state in which the condition is not satisfied to a state in which the condition is satisfied, to enable the voice command function,
wherein the imaging apparatus further comprises a first table and a second table, the first table representing a relationship between voice and processing associated with the voice in a case where the selfie mode is set, and the second table representing a relationship between voice and processing associated with the voice in a case where the selfie mode is not set, and further comprises an execution unit configured to execute processing corresponding to the voice using the first table or the second table according to a setting state of the selfie mode.

2. The imaging apparatus according to claim 1, further comprising:
a face data storage unit for storing a face image of the operator;
a face authentication unit configured to perform face authentication using a face image included in an image photographed by the photographing unit and a face image of the operator stored in the face data storage unit; and
a mode determination unit configured to determine whether the selfie mode is set or not according to the result of the face authentication by the face authentication unit.

3. The imaging apparatus according to claim 2, wherein the determination unit is further configured to determine that the condition to enable the voice command function is satisfied if the face of the operator is authenticated by the face authentication unit.

4. The imaging apparatus according to claim 2, wherein the determination unit is further configured to determine that the condition to enable the voice command function is satisfied if predetermined time elapses after the mode determination unit determines that the selfie mode is set.

5. The imaging apparatus according to claim 1, further comprising:
a face detection unit configured to detect a face image included in the image photographed by the photographing unit,
wherein the determination unit is further configured to determine that the condition to enable the voice command function is satisfied if the face detection unit detects a face image.

6. The imaging apparatus according to claim 1, further comprising:
a face data storage unit for storing a face image of the operator; and
a face authentication unit configured to perform face authentication using a face image included in the image photographed by the photographing unit and a face image of the operator stored in the face data storage unit,
wherein the determination unit is further configured to determine that the condition to enable the voice command function is satisfied if the face of the operator is authenticated by the face authentication unit.

7. The imaging apparatus according to claim 1, further comprising:
a voice data storage unit for storing voice of the operator; and
a voice authentication unit configured to perform speaker authentication using sound collected by the sound collection unit and the voice of the operator stored in the voice data storage unit,
wherein the determination unit is further configured to determine that the condition to enable the voice command function is satisfied if the voice of the operator is authenticated by the voice authentication unit.

8. The imaging apparatus according to claim 1,
wherein the control unit is further configured to disable the voice command function if the determination unit continuously determines that the condition to enable the voice command function is not satisfied for a predetermined time period after the voice command function is enabled.

9. The imaging apparatus according to claim 1,
wherein the control unit is further configured to enable the voice command function if the determination unit continuously determines that the condition to enable the voice command function is satisfied for a predetermined time period.

10. The imaging apparatus according to claim 1,
wherein the sound collection unit further comprises a first sound collection unit for a voice command function and a second sound collection unit for photographing, and
wherein the control unit is further configured to enable the first sound collection unit if the voice command function is enabled and disable the first sound collection unit if the voice command function is disabled.

11. The imaging apparatus according to claim 1,
wherein voice associated with same processing is made longer in the first table as compared to that in the second table.

12. The imaging apparatus according to claim 1, further comprising: a display unit configured to display an image including a reproduced image of the image photographed and a setting screen for operating and setting the imaging apparatus, the imaging apparatus being capable of changing a direction of the display unit, and
a mode determination unit that determines that the selfie mode is set when the photographing unit and the display unit are directed to the same direction.

13. An imaging apparatus comprising:
a photographing unit configured to perform photographing;
a sound collection unit configured to collect voice;
a determination unit configured to determine whether a condition to enable a voice command function, which executes predetermined processing according to a voice associated with the predetermined processing, is satisfied in a case where a selfie mode is set, the selfie mode being an operation mode for photographing, by an operator, the operator himself with the photographing unit; and
a control unit configured, in a case where the selfie mode is not set, to enable the voice command function, and configured, in a case where the selfie mode is set, to enter a state in which the voice command function is disabled, and thereafter, based on a determination result of the determination unit which indicates a change from a state in which the condition is not satisfied to a state in which the condition is satisfied, to enable the voice command function,
wherein the imaging apparatus further comprises a table including processing associated with each voice and tolerance of erroneous recognition represented by a numeric value, and
an execution unit configured to perform processing associated with voice recognized if likelihood information represented by a numeric value generated by the voice recognition is equal to or higher than the numeric value of the tolerance and not to perform processing associated with voice recognized if the likelihood information is not equal to or higher than the numeric value of the tolerance.

14. A method for setting a voice command function which is executed by an apparatus comprising a photographing unit which performs photographing and a sound collection unit which collects voice, comprising:
determining whether a condition to enable a voice command function, which executes predetermined processing according to a voice associated with the predetermined processing, is satisfied in a case where a selfie mode is set, the selfie mode being an operation mode for photographing, by an operator, the operator himself with the photographing unit,
enabling the voice command function in a case where the selfie mode is not set, and
in a case where the selfie mode is set, entering a state in which the voice command function is disabled, and thereafter, based on a determination result of the determining step which indicates a change from a state in which the condition is not satisfied to a state in which the condition is satisfied, enabling the voice command
wherein the apparatus further comprises a first table and a second table, the first table representing a relationship between voice and processing associated with the voice in a case where the selfie mode is set, and the second table representing a relationship between voice and processing associated with the voice in a case where the selfie mode is not set, and said method further comprises executing processing corresponding to the voice using the first table or the second table according to a setting state of the selfie mode.

15. A non-transitory computer readable storage medium storing code which causes a computer comprising a photographing unit which performs photographing and a sound collection unit which collects voice to function as:
- a determination unit configured to determine whether a condition to enable a voice command function, which executes predetermined processing according to a voice associated with the predetermined processing, is satisfied in a case where a selfie mode is set, the selfie mode being an operation mode for photographing, by an operator, the operator himself with the photographing unit; and
- a control unit configured, in a case where the selfie mode is not set, to enable the voice command function, and configured, in a case where the selfie mode is set, to enter a state in which the voice command function is disabled, and thereafter, based on a determination result of the determination unit which indicates a change from a state in which the condition is not satisfied to a state in which the condition is satisfied, to enable the voice command function,
- wherein the computer further comprises a first table and a second table, the first table representing a relationship between voice and processing associated with the voice in a case where the selfie mode is set, and the second table representing a relationship between voice and processing associated with the voice in a case where the selfie mode is not set, and the code further causes the computer to function as an execution unit configured to execute processing corresponding to the voice using the first table or the second table according to a setting state of the selfie mode.

16. A non-transitory computer readable storage medium storing code which causes a computer comprising a photographing unit which performs photographing and a sound collection unit which collects voice to function as:
- a determination unit configured to determine whether a condition to enable a voice command function, which executes predetermined processing according to a voice associated with the predetermined processing, is satisfied in a case where a selfie mode is set, the selfie mode being an operation mode for photographing, by an operator, the operator himself with the photographing unit; and
- a control unit configured, in a case where the selfie mode is not set, to enable the voice command function, and configured, in a case where the selfie mode is set, to enter a state in which the voice command function is disabled, and thereafter, based on a determination result of the determination unit which indicates a change from a state in which the condition is not satisfied to a state in which the condition is satisfied, to enable the voice command function,
- wherein the computer further comprises a table including processing associated with each voice and tolerance of erroneous recognition represented by a numeric value, and the code further causes the computer to function as an execution unit configured to perform processing associated with voice recognized if likelihood information represented by a numeric value generated by the voice recognition is equal to or higher than the numeric value of the tolerance and not to perform processing associated with voice recognized if the likelihood information is not equal to or higher than the numeric value of the tolerance.

17. A method for setting a voice command function which is executed by an apparatus comprising a photographing unit which performs photographing and a sound collection unit which collects voice, comprising:
- determining whether a condition to enable a voice command function, which executes predetermined processing according to a voice associated with the predetermined processing, is satisfied in a case where a selfie mode is set, the selfie mode being an operation mode for photographing, by an operator, the operator himself with the photographing unit,
- enabling the voice command function in a case where the selfie mode is not set, and
- in a case where the selfie mode is set, entering a state in which the voice command function is disabled, and thereafter, based on a determination result of the determining step which indicates a change from a state in which the condition is not satisfied to a state in which the condition is satisfied, enabling the voice command function,
- wherein the apparatus further comprises a table including processing associated with each voice and tolerance of erroneous recognition represented by a numeric value, and said method further comprises executing processing associated with voice recognized if likelihood information represented by a numeric value generated by the voice recognition is equal to or higher than the numeric value of the tolerance and not executing processing associated with voice recognized if the likelihood information is not equal to or higher than the numeric value of the tolerance.

* * * * *